US011077000B2

(12) United States Patent
Braun et al.

(10) Patent No.: US 11,077,000 B2
(45) Date of Patent: Aug. 3, 2021

(54) TRACK ASSEMBLY

(71) Applicant: Stryker Corporation, Kalamazoo, MI (US)

(72) Inventors: Caitlin Marie Braun, Portage, MI (US); Brandon David Naber, Portage, MI (US); Levi Joseph Scheenstra, Plainwell, MI (US); Michael Joseph Hernandez, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 41 days.

(21) Appl. No.: 16/713,988

(22) Filed: Dec. 13, 2019

(65) Prior Publication Data

US 2020/0188198 A1 Jun. 18, 2020

Related U.S. Application Data

(60) Provisional application No. 62/781,195, filed on Dec. 18, 2018.

(51) Int. Cl.
*B60J 7/00* (2006.01)
*A61G 3/02* (2006.01)
*A61G 3/08* (2006.01)

(52) U.S. Cl.
CPC ......... *A61G 3/0254* (2013.01); *A61G 3/0883* (2013.01)

(58) Field of Classification Search
CPC ... G11B 23/0236; A47B 88/493; A47F 1/126; A47F 5/005; A47F 5/0093; B29C 66/71; A61G 1/0237; A61G 1/0262; A61G 1/0567; A61G 3/0891
See application file for complete search history.

(56) References Cited

U.S. PATENT DOCUMENTS

| | | | | |
|---|---|---|---|---|
| 5,567,013 | A * | 10/1996 | Chang | B60N 2/123 297/341 |
| 6,024,528 | A * | 2/2000 | Taylor | A61G 1/06 296/20 |
| 6,899,408 | B2 * | 5/2005 | Chen | A47B 88/493 312/333 |
| 7,320,508 | B2 * | 1/2008 | Booker | F16F 9/0218 312/334.46 |
| 9,357,843 | B2 * | 6/2016 | Jahrling | F16C 33/32 |
| 9,545,345 | B1 * | 1/2017 | Akers, Jr. | A61G 3/0272 |
| 9,750,347 | B2 * | 9/2017 | Nuckolls | A47B 88/443 |
| 10,912,398 | B2 * | 2/2021 | Wills | A47F 5/005 |
| 2009/0015027 | A1 * | 1/2009 | Lambarth | A61G 1/0225 296/20 |
| 2011/0080016 | A1 * | 4/2011 | Lambarth | A61G 1/06 296/20 |
| 2012/0237326 | A1 * | 9/2012 | Van Ness | A61G 3/0272 414/507 |
| 2017/0112694 | A1 * | 4/2017 | Naber | A61G 3/0825 |
| 2020/0038268 | A1 * | 2/2020 | Shrapnel | A61G 3/0245 |

* cited by examiner

*Primary Examiner* — Kiran B Patel
(74) *Attorney, Agent, or Firm* — Warner Norcross + Judd LLP

(57) ABSTRACT

A track assembly for mounting a movable object includes a track having a web and at least one flange joined with the web. A stop assembly is mounted to the track at the web by a releasable connection and configured to engage the flange to form a moment restraint for the connection of the stop assembly to the web.

20 Claims, 20 Drawing Sheets

TRACK ASSEMBLY

This application claims the benefit of U.S. Prov. Pat. Appl. Ser. No. 62/781,195 (P-618) filed Dec. 18, 2018, by inventors Caitlin Marie Braun et al. and entitled TRACK ASSEMBLY and relates to U.S. patent Ser. No. 15/253,140 (P-269E), entitled AMBULANCE COT AND LOADING AND UNLOADING SYSTEM and filed Aug. 31, 2016, which is a continuation of U.S. patent Ser. No. 14/630,681 (P-269D), entitled AMBULANCE COT AND LOADING AND UNLOADING SYSTEM and filed Feb. 25, 2014, by Applicants Clifford Lambarth et al., which is a divisional application of U.S. co-pending application Ser. No. 13/888,654 (P-269C), entitled AMBULANCE COT AND LOADING AND UNLOADING SYSTEM and filed May 7, 2013, now U.S. Pat. No. 8,973,963, issued on Mar. 10, 2015, by Applicants Clifford Lambarth, et al., which is a divisional application and claims priority to application Ser. No. 12/886,987 (P-269B), entitled AMBULANCE COT AND LOADING AND UNLOADING SYSTEM and filed Sep. 21, 2010, now U.S. Pat. No. 8,439,416, issued on May 14, 2013, by Applicants Clifford Lambarth, et al., which claims the benefit of provisional application Ser. No. 61/248,374 (P-269), entitled AMBULANCE COT AND LOADING AND UNLOADING SYSTEM and filed Oct. 2, 2009, and provisional application Ser. No. 61/248,654 (P-269A), entitled AMBULANCE COT AND LOADING AND UNLOADING SYSTEM and filed Oct. 5, 2009, which are incorporated herein in their entireties and commonly assigned to Stryker Corporation of Kalamazoo, Mich.

TECHNICAL FIELD AND BACKGROUND OF THE INVENTION

The present invention relates to a track with a removable stop assembly that is configured to distribute the forces to the track in a manner so that the track can better withstand high impact loading.

A suitable application includes an ambulance cot and loading and unloading system that has a movable track to load an ambulance cot into an emergency vehicle. One of the challenges in an ambulance cot and loading and unloading system is to minimize the footprint of the loading and unloading system in the emergency vehicle so as not to interfere with access by an emergency medical service (EMS) attendant to a patient supported on a loaded ambulance cot while at the same time providing a loading and unloading system that can extend at a sufficient distance outwardly from the vehicle to load the cot into the vehicle. Another challenge is to provide a loading and unloading system that can withstand impact loads, for example, impact loads that occur during a crash.

Accordingly, there is a need to provide a track and stop assembly that can withstand impact loads associated with a crash, which may be employed in an ambulance cot and loading and unloading system.

SUMMARY OF THE INVENTION

Accordingly, in one embodiment of a track assembly for mounting a movable object, the track assembly includes a track having a web and at least one flange joined with the web. A stop assembly is mounted to the track at the web by a releasable connection and configured to engage the flange to form a moment restraint for the connection of the stop assembly to the web.

In one aspect, the stop assembly is mechanically coupled to the flange.

In a further aspect, the flange comprises an upper flange, and the track has a lower flange joined with the web, wherein the stop assembly is engaged with the lower flange. For example, the stop assembly may be mechanically coupled to the lower flange.

In another embodiment, the stop assembly frictionally engages the flange.

In another embodiment, the stop assembly includes a bumper and a dead stop member, with the dead stop member mounted to the web through the bumper.

In one aspect, the bumper includes a slot to receive the web. When the stop assembly is mounted to the web, the bumper straddles the web.

In yet other aspects, the bumper includes a base and a bearing member cantilevered from the base. For example, the bearing member may be cantilevered from the base by a bumper arm. In this configuration, the dead stop member straddles the bumper arm when mounted to the track.

In a further aspect, the flange comprises an upper flange, and the track has a lower flange joined with the web, with the dead stop member engaging the upper and lower flanges.

In another aspect, the upper and lower flanges have a fixed spacing, and the dead stop member has a height greater than the fixed spacing of the flanges. The upper and lower flanges are notched to allow the dead stop member to be mounted to the web at the notches.

In another embodiment, a track assembly includes a track and a stop assembly mounted to the track. The stop assembly includes a bumper and a dead stop member. The bumper has a base and a bearing member cantilevered from the base by a bumper arm. The dead stop member straddles the bumper arm when mounted to the track.

In one aspect, the track includes a web and a flange extending from the web, and the stop assembly is mounted to the web.

In a further aspect, the dead stop member is mounted to the web and engages the flange to transfer forces to the flange.

In another embodiment, a track assembly for mounting a movable object includes a track, with the track having a web and at least one flange joined with the web, and a stop assembly. The stop assembly is mounted to the track at the web by a fastener. The stop assembly has a bumper and a dead stop member that engages the web through the bumper and has a bearing surface. The fastener extends through the dead stop member and through the bearing surface to engage the web at an edge distance less than the minimum distance outlined per RISC-ANSI-360-10 can be achieved.

In one aspect, the property is selected from the group consisting of diameter, cross-sectional area, and shear capacity.

In another embodiment, a track assembly for mounting a movable object includes a track and a stop assembly. The track has a web and at least one flange joined with the web, with the web having a terminal edge. The stop assembly is mounted to the track at the web by a fastener, which has a fastener spacing to the terminal edge of the web. The stop assembly is configured to transfer forces from the web to the flange wherein the fastener spacing is less than a minimum edge distance without compromising the web.

A method of installing a stop assembly on a track includes the steps of providing a track with a web and upper and lower flanges joined with the web at a fixed spacing and providing a stop assembly, which includes a bumper and a dead stop member having a height greater than the fixed spacing. The bumper is inserted onto the web of the track, and then the dead stop member is inserted into the bumper to engage the web and the flange.

In one aspect, the method further includes notching at least the lower flange to allow the dead stop member to be inserted into the bumper and into engagement with the web.

In another embodiment, a method of installing a stop assembly on a track includes providing a track with a web and upper and lower flanges joined with the web at a fixed spacing, the web having a terminal edge, and providing a stop assembly with a bumper and a dead stop member having a height greater than the fixed spacing. The method further includes the steps of inserting the dead stop member into the bumper, and sliding the bumper and the dead stop member onto the web of the track from the terminal edge.

In one aspect, the method further includes notching at least the upper and lower flanges to the terminal edge of the web to allow the bumper and the dead stop member to be slid onto the web without interference from the flanges.

In any of the above, the track may be movable and/or a track of an ambulance cot and loading and unloading apparatus.

In one form of the invention, an ambulance cot loading and unloading apparatus includes a base for mounting to an emergency vehicle deck, the track mounted for linear movement along the base, and a trolley, which is configured to engage a cot, mounted for linear movement along the track from a retracted position to an extended position.

In a further embodiment, the trolley includes at least one arm to engage a cot.

Accordingly, the present invention provides a track assembly with a track and a stop assembly that can redistribute loading from the web to the one or more flanges of the track to reduce the stresses in the web. These and other advantages will become more apparent to one of ordinary skill in the art upon reading the following specification and inspecting the accompanying drawings, which follow.

DETAILED DESCRIPTION OF THE PREFERRED EMBODIMENT

Figure 1:
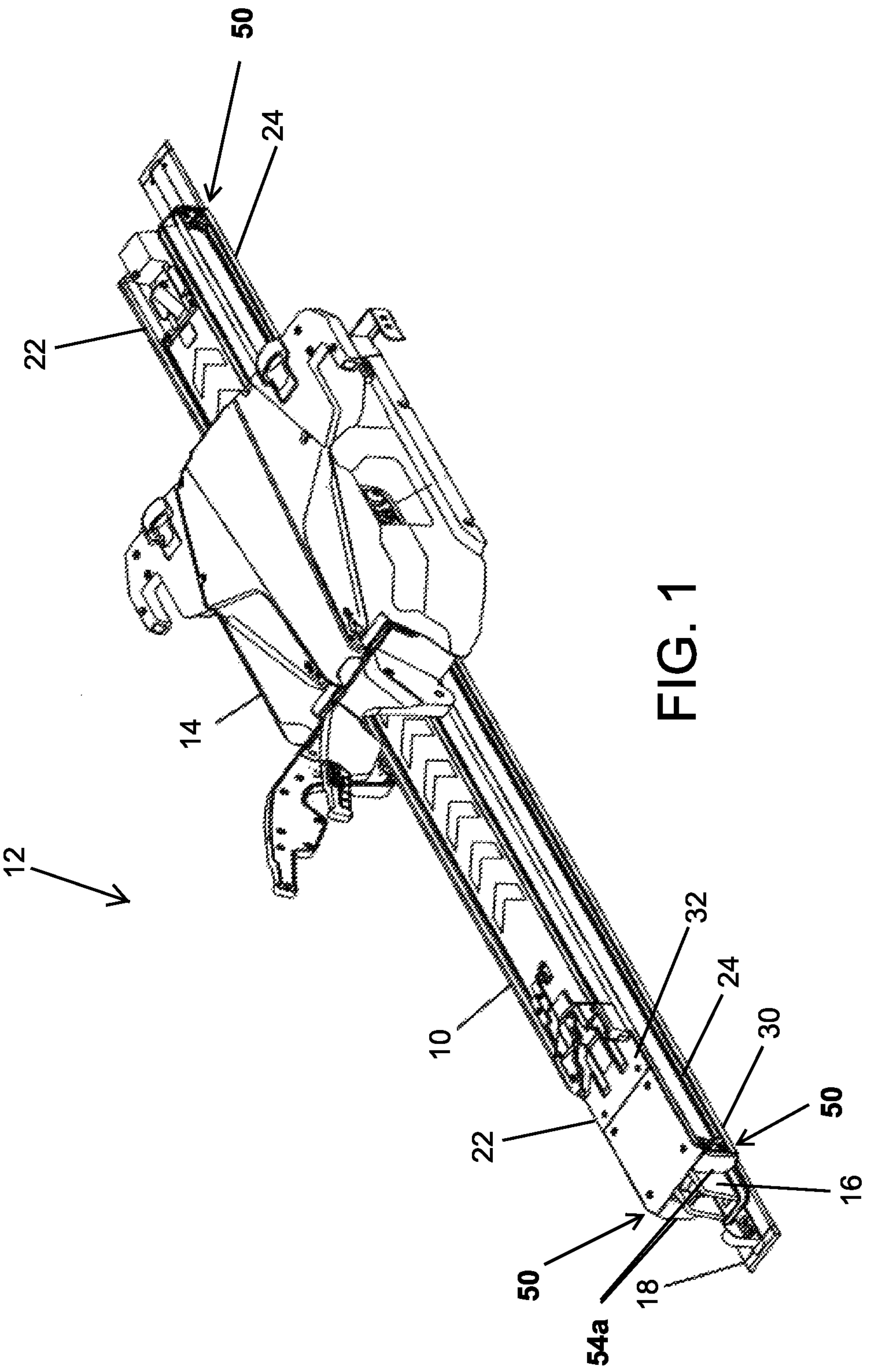
FIG. 1 is a perspective view of an ambulance cot loading and unloading apparatus.

Referring to FIG. 1, the numeral 10 generally designates a track with a stop assembly. Although illustrated in the context of a track for an ambulance cot and loading and unloading apparatus 12 of an ambulance cot and loading and unloading system, it should be understood that the track described herein may be used in a variety of different applications. As will be more fully described below, the stop assembly mounted to the track 10 is configured to better distribute the forces to the track so that it can better withstand greater loading, such as high impact forces associated with a crash.

As best seen in FIG. 1, ambulance cot loading and unloading apparatus 12 includes a trolley 14, which is configured to engage and support an ambulance cot. The trolley 14 is mounted on the track 10 for movement there along to move the ambulance cot in and out of the emergency vehicle in which the cot loading and unloading apparatus is mounted. In the illustrated embodiment, track 10 is movably mounted on a base 16, which is secured to the compartment floor of the emergency vehicle via a floor plate 18, and thus forms a transfer track to assist in transferring the trolley 14 and ambulance cot (not shown) supported thereon in and out of the emergency vehicle. For details of a suitable cot reference is made to U.S. Pat. Nos. 7,540,547 and 5,537,700, which are incorporated by reference herein in their entireties.

Further as will be more fully described below, track 10 is configured to be releasably latched to the base 16 wherein the trolley 14 can translate along track 10, but then can be unlatched so that the trolley 14 and track 10 may move in unison relative to the base 16. Further, with this configuration, track 10 and trolley 14 form a nested, telescoping arrangement to provide greater extension or reach of the trolley from the emergency vehicle.

Figure 2:
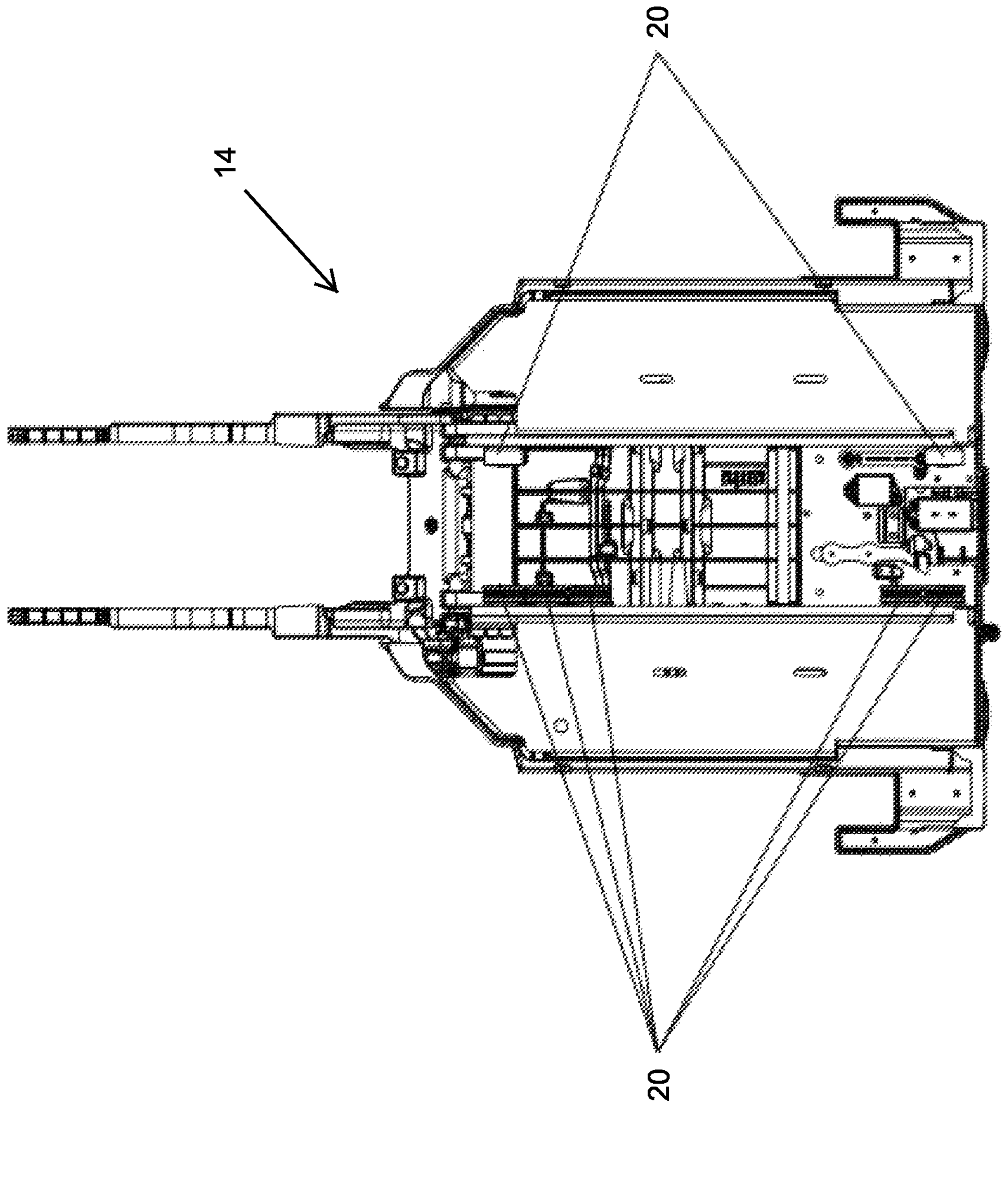
FIG. 2 is a bottom plan view of the trolley of the ambulance loading and unloading apparatus.

In the illustrated embodiment, and referring to FIG. 2, trolley 14 includes a plurality of rollers 20 mounted to its underside for engagement of track 10, which guide trolley 14 along track 10. Similarly, as described below, base 16 also includes a plurality of rollers 40 to movable mount track 10 along base 16.

Figure 3:
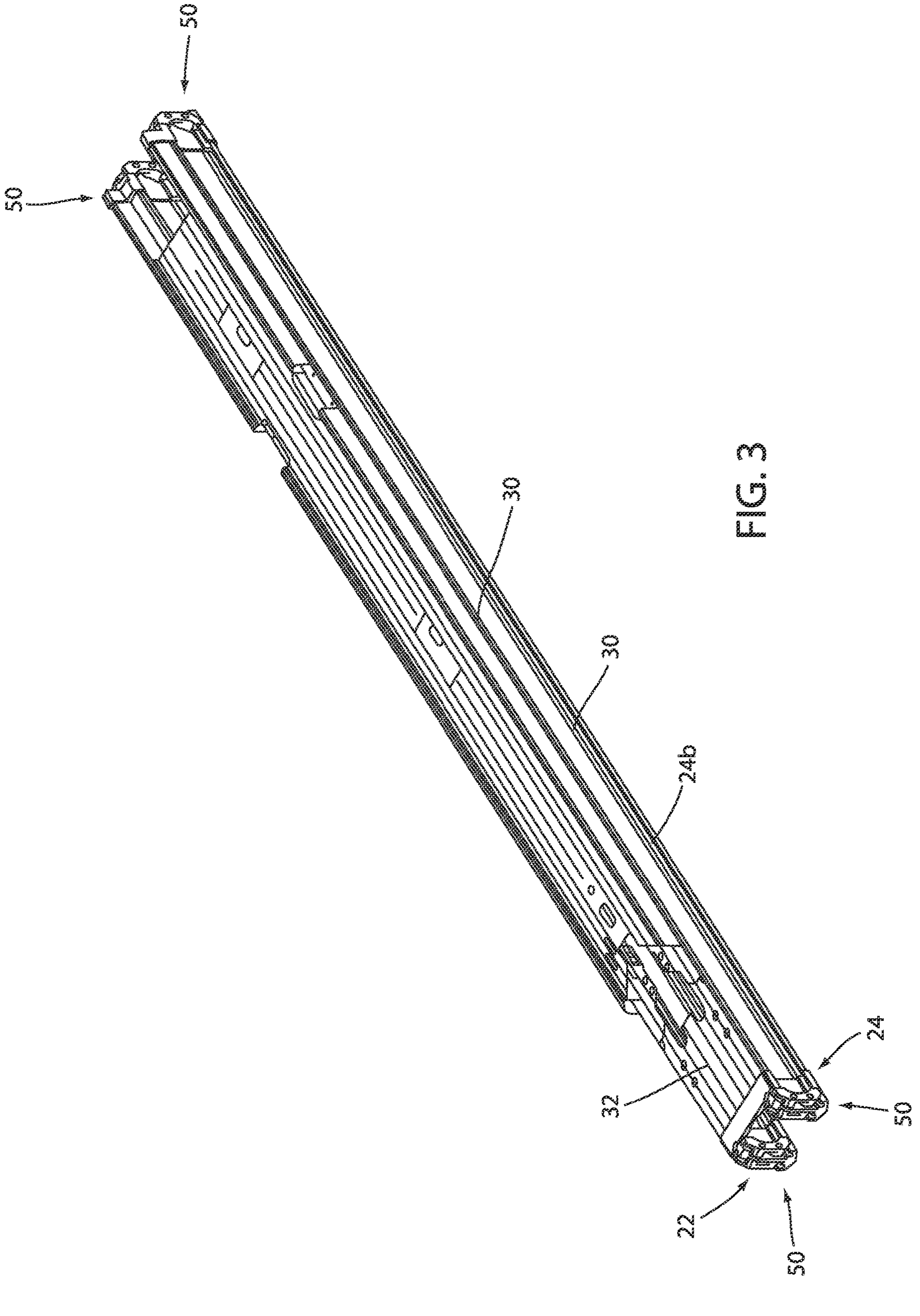
FIG. 3 is a perspective view of the transfer track of the ambulance cot loading and unloading apparatus.

Referring to FIG. 3, in the illustrated embodiment, track 10 is formed by a pair of spaced beams 22 and 24, for example, I-beams. Each beam 22, 24 includes an inward lower bearing surface 22*a*, 24*a*, an outer lower bearing surface 22*b*, 24*b*, an inward upper bearing surface 26*a*, 28*a*, and an outer upper bearing surface 26*b*, 28*b*, which are formed at or by their respective flanges 22*c*, 24*c*. Optionally, referring to FIG. 3A, the respective bearing surfaces are provided by rods 30 that are mounted in channels formed on the respective flanges 22*c*, 24*c* of each I-beam 22, 24, with rollers 20 of trolley 14 configured to engage the upper and lower rods 30 mounted at the upper and lower outer bearing surfaces 26*b*, 28*b*, and 22*b*, 24*b* to thereby movable mount trolley 14 to track 10. Rollers 40 of base 16, on the other hand, are configured to engage the upper and lower rods 30 mounted at the upper and lower flanges 22*c*, 24*c*, which form the upper and lower inner bearing surfaces 26*a*, 28*a*, and 22*a*, 24*a*, to thereby movable mount track 10 on base 16.

Figure 3A:
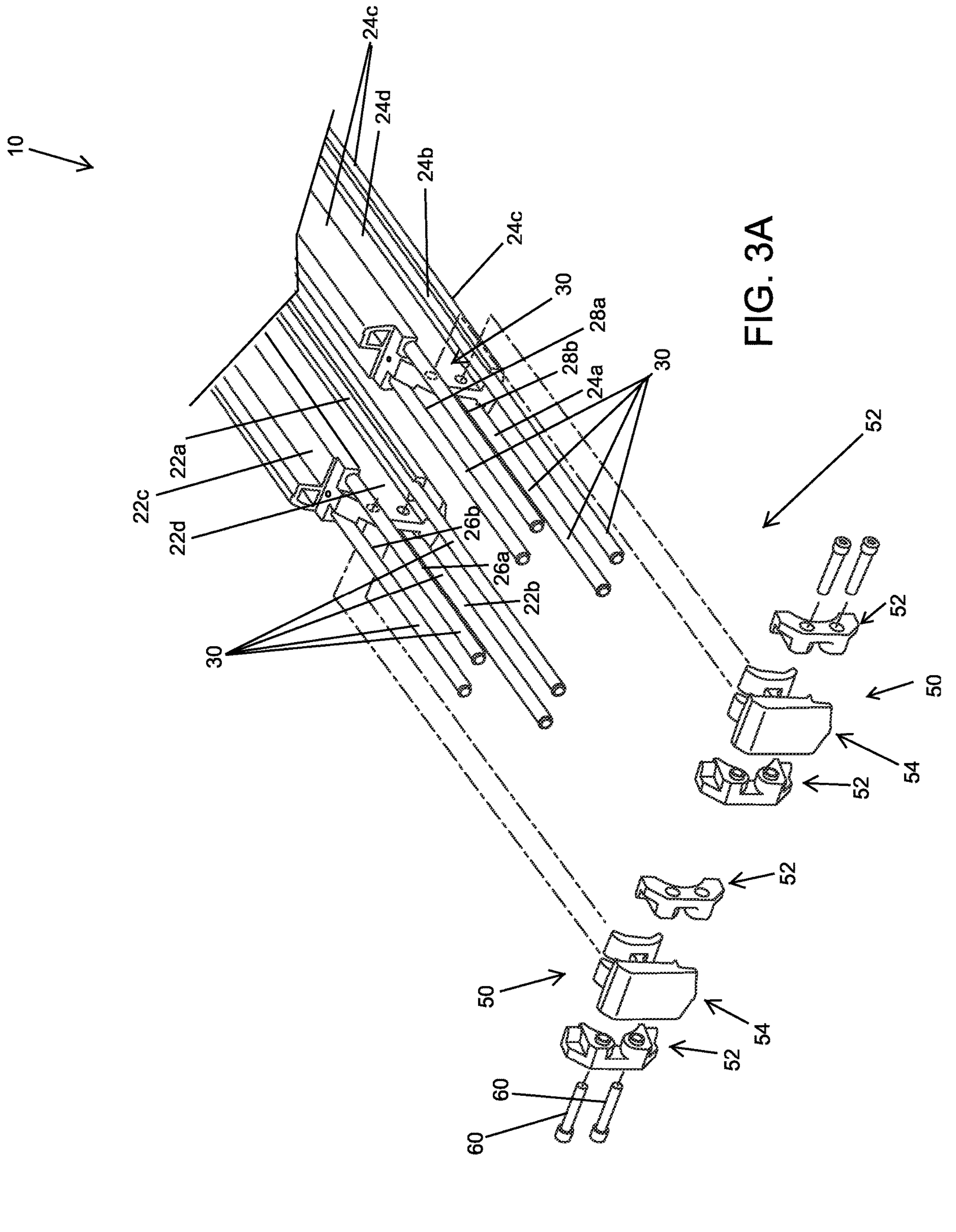
FIG. 3A is an enlarged fragmentary, perspective view of the foot end of the transfer track illustrating the rods that form the roller bearing surfaces of the track.
Figure 17:
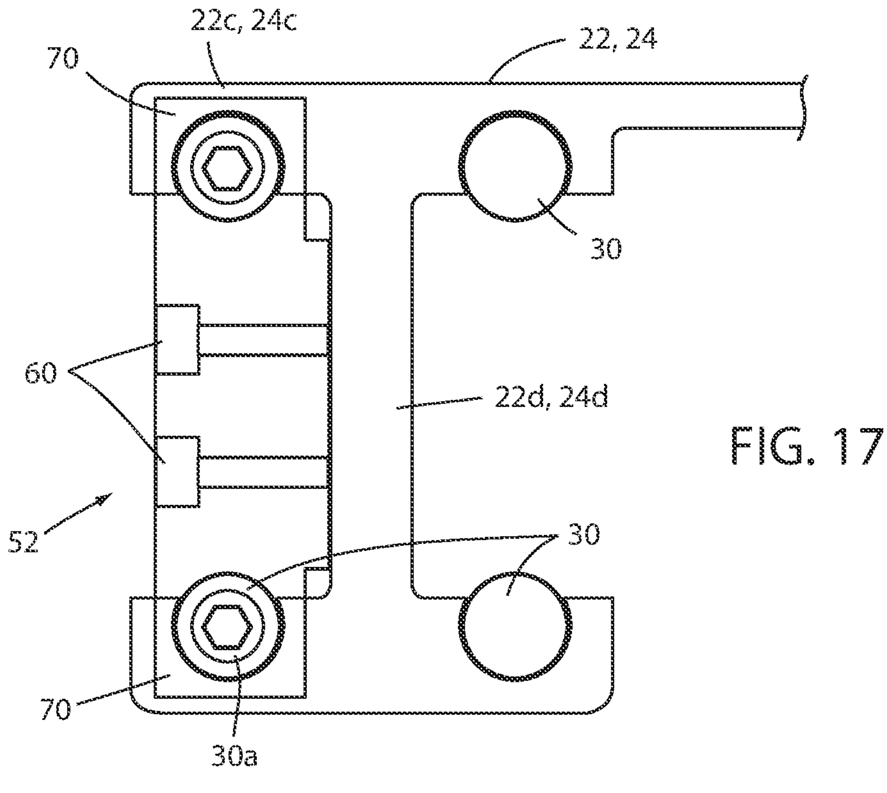
FIG. 17 is a cross-section view of another embodiment of an optional fastening arrangement for the stop of the stop assembly.

As noted above, rods 30 are mounted in channels formed on the respective flanges 22*c*, 24*c* of each I-beam 22, 24 (FIGS. 3 and 3A). Further, rods 30 are retained in place by the respective stop assemblies 50. In the illustrated embodiment, when rods 30 are mounted in the channels formed in flanges 22*c*, 24*c*, the ends of the respective rods 30 bear against the body 70 (FIG. 5) (more fully described below) of each dead stop member 52. Optionally, dead stop members 52 may be mechanically coupled to the respective rods 30. For example, as best illustrated in FIG. 17, dead stop members 52 may be mechanically coupled to one or more of the respective rods via fasteners 30*a* that extend, for example, through body 70 of the stop member 52 and into threaded bores formed in the ends of rods 30. Thus, the stop members 52 may be integrated with one or more of the rods to redistribute some of the loads from the web of the beams to the rods, which in turn distribute some of their loads to the flanges of the beams.

Figure 4:
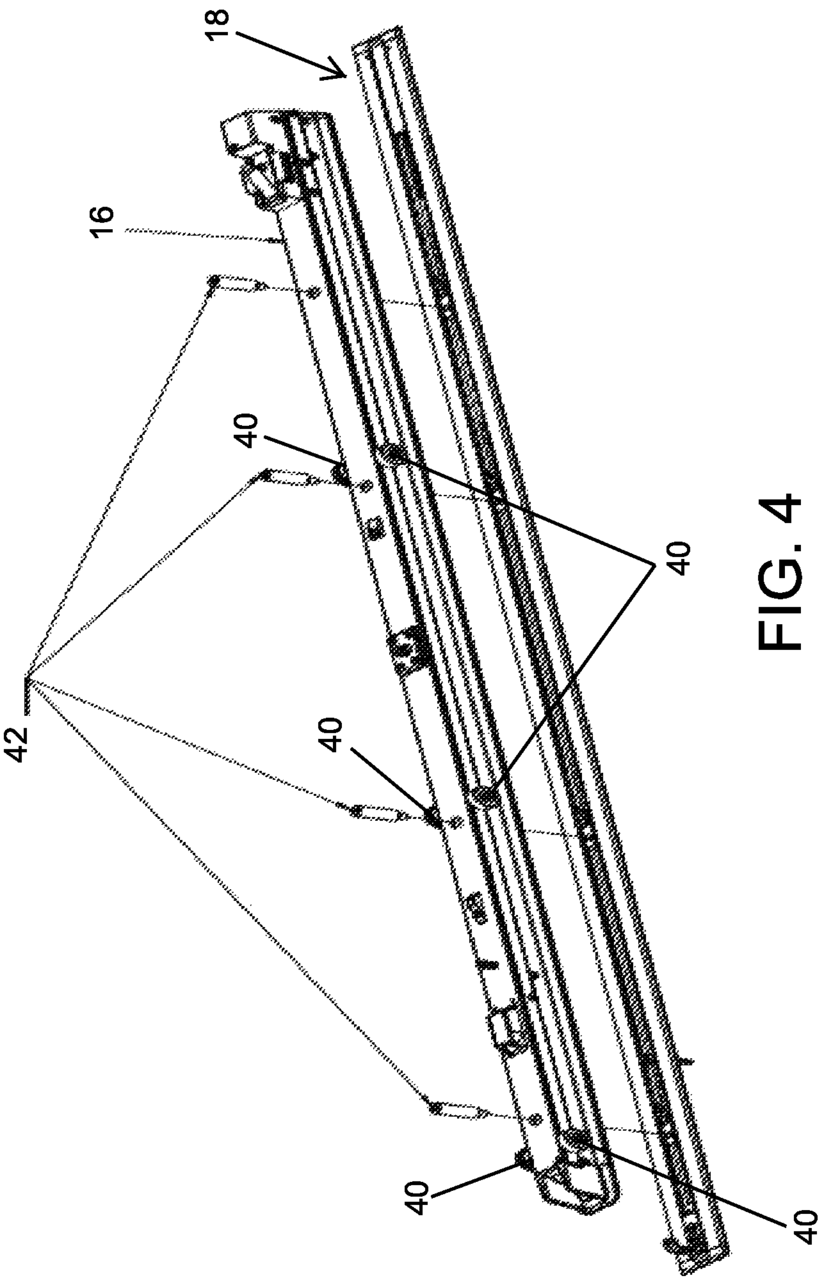
FIG. 4 is a perspective view of the anchor or base of the ambulance cot loading and unloading apparatus.

In the illustrated embodiment, track 10 is a unitary track with beams 22, 24 joined and held in spaced registry by an upper plate 32, which may be integrally formed together as an extrusion. For example, in the illustrated embodiment, upper plate 32 forms the upper flanges 22*c*, 24*c* of each respective beam 22, 24. Similarly, referring to FIG. 4, base 16 is also formed by a structural member, such as an inverted channel-shaped extrusion, such as aluminum channel-shaped extrusion, which is anchored to the cargo area by floor plate 18 via fasteners 42, described more fully in the above referenced and incorporated patents and application. As noted above, mounted to base 16 are a plurality of rollers 40 that are configured and arranged to engage the upper and lower inner bearing surfaces 26*a*, 28*a*, and 22*a*, 24*a* of beams 22, 24 to thereby movable mount track 10 onto base 16. For further details of trolley 14, base 16, and track 10 and other features not mentioned herein reference is made to the above incorporated patents and pending application.

To stop the motion of the track 10 along the base 16 and the motion of the trolley 14 along the track 10, each end of track 10 includes one or more stop assemblies 50. In the illustrated embodiment, each beam 22, 24 of track 10 includes a stop assembly at each end thereof, which provide inner and out stops for the base and for the trolley, respectively. As noted above, although described and illustrated in reference to an ambulance cot loading and unloading apparatus and system, it should be understood that the stop assemblies described herein may be used with other types of tracks and/or in other applications. For example, although illustrated and described below in the context of the track being formed by two beams, the stop assemblies described herein may be used and configured for mounting to a track formed from a single beam. Additionally, although track 10 is illustrated and described herein as having a stop assembly for each beam, a single stop assembly is also contemplated that can straddle both beams to provide a single stop assembly at one or both ends of the track. Further, while track 10 is illustrated as moveable track, and namely a transfer track, the track may be a stationary track and, further, have a different cross-section from the I-beam described herein.

In the illustrated embodiment, trolley 14 includes an inverted channel at its underside, which straddles track 10 and is mounted to track 10 by rollers 20, such as wheels, that ride along outer bearing surfaces 22*b*, 24*b*, 26*b*, and 28*b* in either direction until rollers 20 reach stop assemblies 50 mounted at the ends of track 10. As described in the referenced patents and application, track 10 is movably mounted on base 16 but may be selectively latched to the base 16. When track 10 is unlatched from base 16, track 10 is configured to fully extend in either direction along base 16 until stop assemblies 50 reach rollers 40 (either foot end rollers or head end rollers) on base 16. Thus, when track 10 is fully extended along base 16 (where the head end stop assemblies on track 10 reach the foot end rollers on base 16) and trolley 14 is fully extended along track 10 (where the head end rollers 20 reach the foot end stop assemblies on track 10), trolley 14 extends from track 10 beyond base 16 (see above referenced patents). In this manner, trolley 14 can be extended from the cargo area of the emergency vehicle and, further, such that trolley 14 is outside of the emergency vehicle to allow an emergency cot to be unloaded from or loaded onto the trolley 14 for unlading or loading the cot from or into the emergency vehicle.

On the other hand, when a cot is supported on trolley 14 and loaded into the emergency vehicle, trolley 14 can then be retracted along track 10, and then track 10 and trolley 14 together retracted along base 16 until track 10 and trolley 14 are fully loaded into the emergency vehicle compartment (where head end rollers 20 reach the head end stop assemblies on track 10), and track 10 is fully retracted along base 16 (where the foot end stop assemblies reach the foot end rollers on base 16).

Referring to FIG. 3, in the illustrated embodiment, as noted each beam 22, 24 includes a stop assembly 50 at each end of the respective beam 22, 24. Further, as best understood from FIGS. 3A and 7, each stop assembly 50 includes a pair of dead stop members 52, which are mounted to opposed sides of the respective web 22*d*, 24*d* of the respective beam 22, 24, and an optional bumper 54 to reduce metal-to-metal contact and, hence, noise. While a pair of dead stop members and a single bumper are shown and described for each stop assembly, a single dead stop member and/or multiple bumpers are optional depending on the application and desired ease of installation. Therefore, the number of dead stop members 52 and/or bumpers 54 may be varied. Further, in the illustrated embodiment, dead stop members 52 are symmetrical so that the same dead stop member can be mounted in any of the dead stop member positions—e.g. the outer or inner side of the beam and/or to either end of the beam. It should be understood that asymmetrical dead stop members may be used instead. Further, one of the dead stop members may be larger and extend further along the web in the direction of the roller travel to redistribute forces further along the respective web 22*d*, 24*d*.

Dead stop members 52 are formed from metal, such as a powdered metal, such as powdered stainless steel. Bumper 54 may be formed from a resilient, compressible material, such a rubber, to reduce the noise when the stop is subject to a load. To better distribute the loading that can be applied to stop assemblies 50, whether it is dynamic loading from quickly loading or unloading a cot into or out of the vehicle or dynamic loading that can occur when an emergency vehicle is in a crash, stop assemblies 50 are configured to transfer some of the load off the web 22*d*, 24*d* of the beams 22, 24 to one or more of the flanges 22*c*, 24*c* of the beams 22, 24 and/or rods 30, as noted above.

Figure 5:
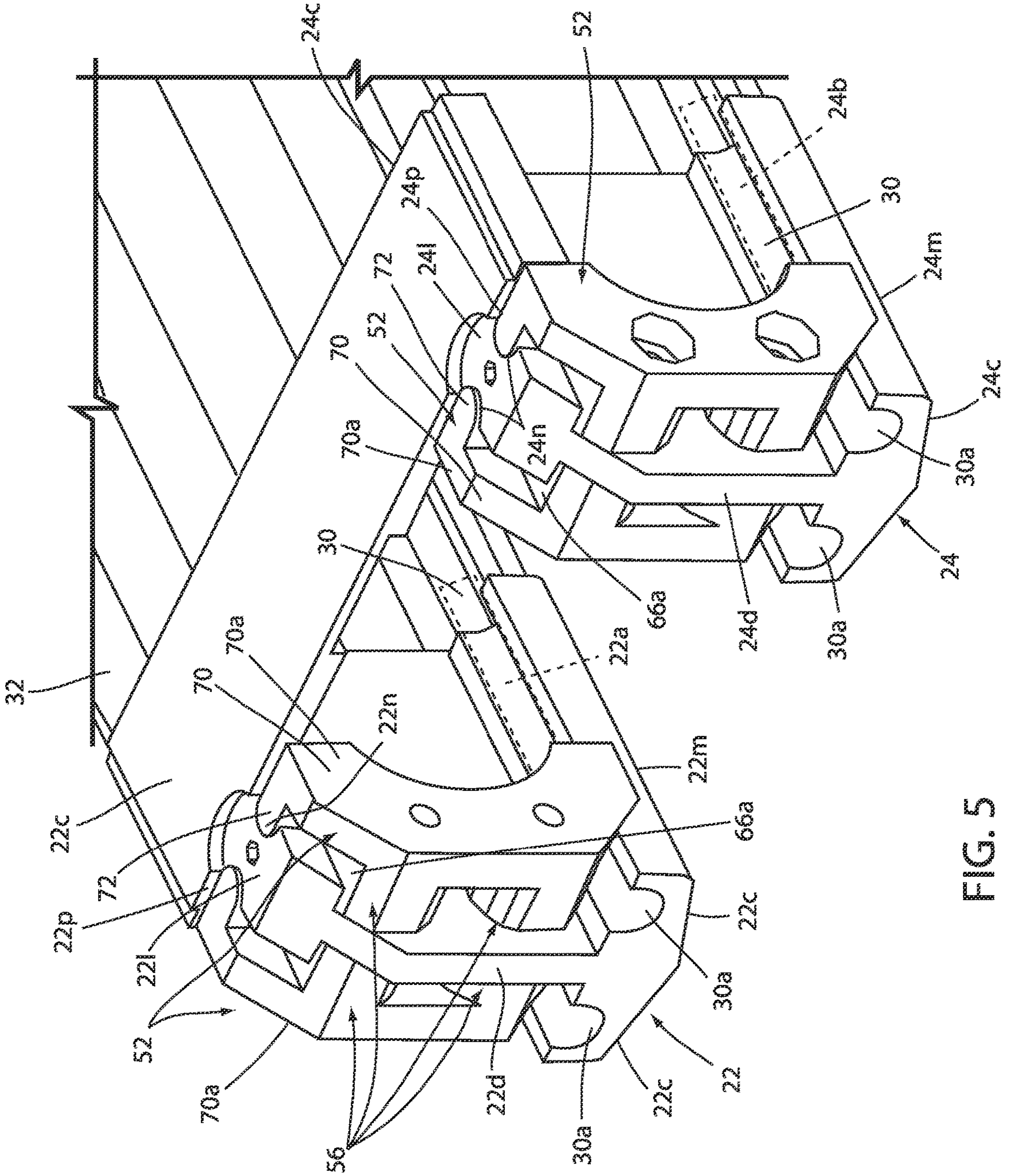
FIG. 5 is an enlarged perspective view of the foot end of the transfer track of the ambulance cot loading and unloading apparatus.
Figure 6:
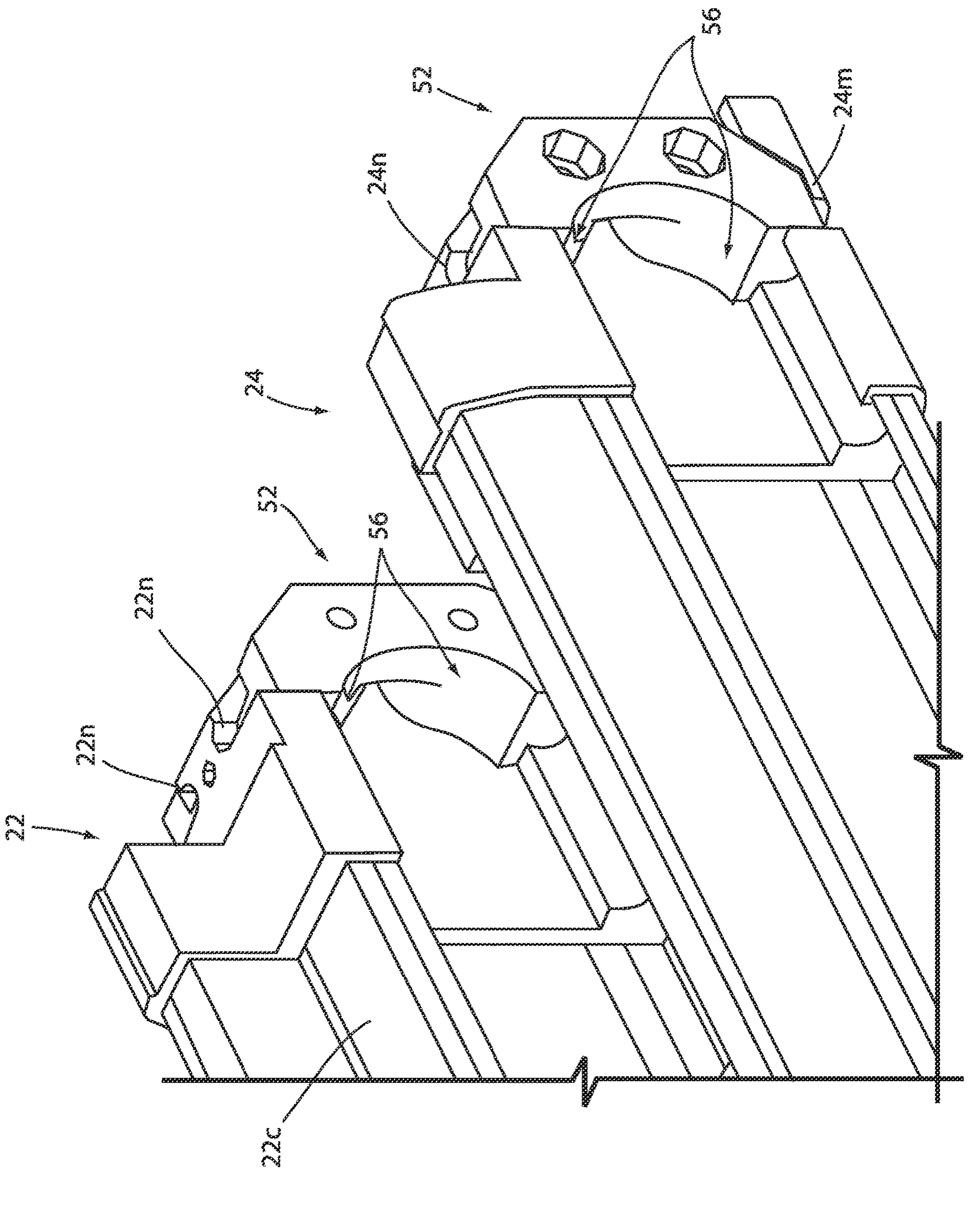
FIG. 6 is an enlarged perspective view of the head end of the transfer track of the ambulance cot loading and unloading apparatus.

As best seen in FIGS. 5 and 6, each dead stop member 52 is mounted to each side of the web 22*d*, 24*d* of the respective beam 22, 24. In the illustrated embodiment, dead stop members 52 are removably mounted to the respective webs 22*d*, 24*d* by fasteners 60, which allow track 10 to be removed from base 16 and/or allow trolley 14 to be removed from track 10, which in turn allows access to the fasteners that secure base 16 to floorplate 18 so that base 16 can be removed from floor plate 18 to provide access to the various components.

Figure 8:
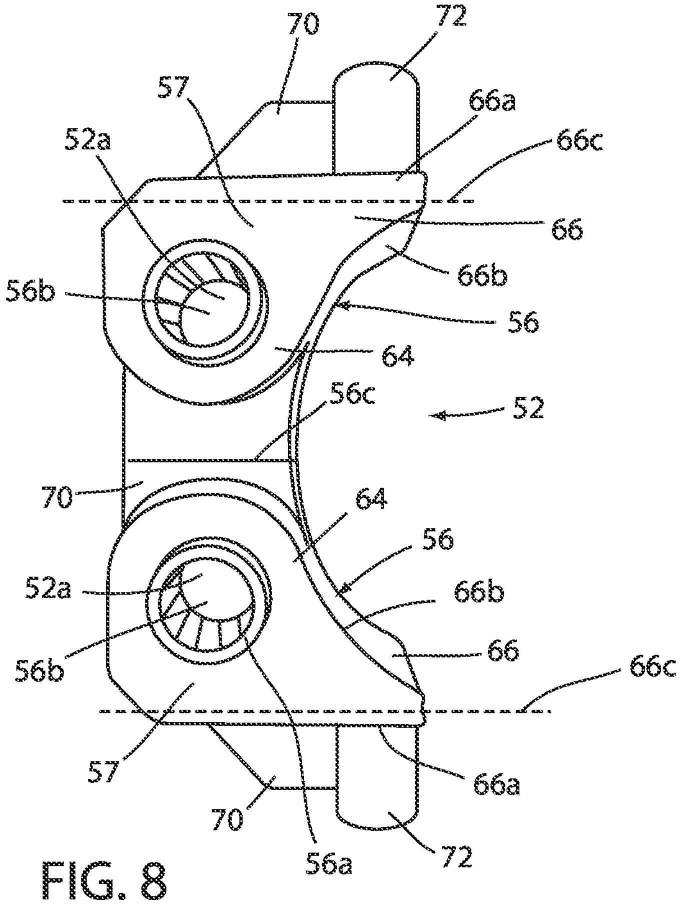
FIG. 8 is an enlarged side elevation view of the stop assembly.

As best seen in FIG. 8, each dead stop member 52 includes two bearing blocks 56. Optionally, each bearing block 56 includes an annular projecting wall or collar 56*a*. Collars 56*a* extend around the mounting openings 52*a* formed, such as by machining, in dead stop members 52 and form bosses that extend at least partially into the mounting openings 62 (FIGS. 11-14) formed in webs 22*d*, 24*d* and through which the respective fasteners 60 extend to mount the stop assemblies to the beams 22, 24. Optionally, openings 52*a* may be threaded to act as a nut for fasteners 60. Further, while two mounting openings (52*a*, 62) are shown, it should be understood that more or less mounting openings may be provided—in other words, a single faster may be used or more than two fasteners may be used. Further, because of the configuration of the bumpers, described more fully below, the hole pattern may be varied.

Collars 56*a* (bosses) are sufficiently rigid and robust to transfer the shear load from the dead stop members 52 to webs 22*d*, 24*d* of beams 22, 24 to thereby allow the shear forces to by-pass the fasteners 60, which would otherwise be transferred to the webs 22*d*, 24*d* via the fasteners 60. Thus, the bosses reduce, if not eliminate, the shear load on the fasteners 60. As would be understood from FIGS. 5 and 6, when the two dead stop members 52 are mounted on opposed sides of the respective web 22*d* or 24*d* of the respective beam 22 or 24, collars 56*a* (bosses) extend into the web to provide adjacent, and optionally spaced apart, bearing surfaces internal to openings 62 for fasteners 60 or they may be sized to provide adjacent and contiguous bearing surfaces for the respective fastener. Alternately, in some embodiments, the collars 56*a* (bosses) may be eliminated.

Bearing blocks 56 are configured to contact and bear on the respective webs 22*d*, 24*d* of the respective beams 22, 24 about the respective fasteners 60 and further contact and bear on the respective webs above and below the respective fasteners (e.g. above and below the footprint of a standard washer would contact) and also with a non-circular interface. As best understood from FIGS. 5 and 6, each bearing block 56 bears against the respective web 22*d*, 24*d* from the fastener (60) to a location spaced from the fastener, including up to (or down to) the interface (or intersection) between the respective web 22*d*, 24*d* and the flange 22*c*, 24*c* thus creating an increased torsional resistance than that of a standard washer.

Optionally, the bearing surface 57 of each bearing block 56 may have a high friction surface, such as a knurled surface, over at least a portion of its surface area to increase the friction between bearing blocks 56 and webs 22*d*, 24*d* to better distribute the shear forces from dead stop members 52 to the respective webs 22*d*, 24*d*. Alternately or in addition, the outer surface of collars 56*a* may have a high friction surface, such as a knurled surface, to increase the friction between bearing blocks 56 and webs 22*d*, 24*d*, again to better distribute the shear forces from dead stop members 52 to the respective webs 22*d*, 24*d*.

In the illustrated embodiment, bearing blocks 56 have a generally cylindrical shape body 64 with enlarged tapered lobes 66, which are flat or planar on their outer surfaces 66*a*, but curved on their inner surfaces 66*b* to form generally P-shaped bearing blocks that face each other. In other words, bearing blocks 56 are mirror images of each other about a plane 56*c* that bifurcates the two bearing blocks 56. As best seen in FIG. 8, plane 56*c* is centrally located between and parallel to central axes 56*b* of collars 56*a* (i.e., the bosses).

Lobes 66 extend along an axis 66*c* that is spaced from and parallel to central axes 56*b* of collars 56*a* and are sufficient in height to extend and bear along the downwardly and upwardly facing surfaces of the respective flanges 22*c*, 24*c* at their juncture with the web 22*d*, 24*d* of the respective beam 22 or 24. In this manner, outer surfaces 66*a* of lobes 66 each form a bearing surface to increase the torsional resistance of dead stop members 52 (and hence stop assemblies 50) and redistribute some of the torsional load from the respective web 22*d*, 24*d* to the respective flange or flanges 22*c*, 24*c* of beams 22, 24. For example, lobes 66 may extend in a range of 1.0 cm-2.0 cm, or about 1.5 cm, beyond the central axes 56*b* of cylindrical shaped bodies 64 where the diameter of the cylindrical shaped bodies 64 is about 1.0 cm-2.0 cm or about 1.5 cm.

Alternately or stated another way, lobes 66 may form a bearing surface of at least a length (in the direction of force) equal to the diameter of the cylindrical shaped bodies 64, optionally about 110% of the diameter of the cylindrical shaped bodies 64, optionally about 120% of the diameter of the cylindrical shaped bodies 64, or optionally about 130% of the diameter of the cylindrical shaped bodies 64. Further, in the illustrated embodiment, the bearing surface (outer surfaces 66*a*) of each lobe 66 of each dead stop member 52 may be offset from the central axes 56*b* of collars 56*a* so that the centroid of the bearing surface is offset from the central axes 56*b* of collars 56*a* to increase the torsional resistance provided by the respective bearing surface.

In one embodiment, the area of the bearing surface 57 (FIG. 8) of each bearing block 56 (which is formed by the cylindrical shaped bodies 64 and lobes 66) is at least 0.5 square inches, optionally greater than 0.75 square inches, optionally greater than 1.0 square inch, and optionally about 1.08-1.10 square inches, for example, about 1.09 inches. With this configuration, the bearing surfaces 57 formed by the bearing blocks 56 that contact the respective webs 22*d*, 24*d* of the respective beams is increased over the prior art stops shown in the incorporated patents and application by at least by a factor of 2, optionally at least by a factor of 3, optionally at least by a factor of 4, optionally by a factor of 4.5. With increased contact between the bearing blocks 56 and the webs 22*d*, 24*d*, the stresses in the respective webs 22*d*, 24*d* are reduced. For example, with this increased bearing surface, the ratio of the bearing surface 57 formed by the bearing blocks 56 (that contact the respective webs 22*d*, 24*d* of the respective beams 22, 24) to fastener cross-section may be in a range of 18 to 27, optionally in a range of 39 to 40, and optionally greater than 40.

Dead stop members 52 also include a body 70 on which bearing blocks 56 are commonly formed on or mounted. As best viewed in FIGS. 5, 6 and 8, body 70 extends above and below bearing blocks 56 but has the same side-to-side footprint (or width) of the bearing blocks 56. In the illustrated embodiment, each body 70 is formed by a plate 70*a* with the bearing blocks 56 projecting from the plate. As best seen in FIGS. 5 and 6, extending inwardly from body 70 (when dead stop members 52 are mounted to a respective web 22*d,* 24*d* of the respective beam 22, 24) are upper and lower integrally formed ribs or projections 72 (integrally formed with body 70), which are also integrally formed with and extend upwardly and downwardly from upper and lower lobes 66. Projections 72 are sized and shaped to extend into notches 22*n,* 24*n* formed in flanges 22*c,* 24*c* to thereby further redistribute the load from webs 22*d,* 24*d* to one or more flanges 22*c,* 24*c.*

Thus, when dead stop members 52 are mounted to the respective beams 22, 24 by fasteners 60 (FIG. 7), projections 72 mechanically engage the respective flanges 22*c,* 24*c* of the beams 22, 24 by way of notches 22*n,* 24*n* (as shown in FIGS. 5-6), which further distribute the loading on stop assemblies 50 from the webs 22*d,* 24*d* to respective flanges 22*c,* 24*c,* thus reducing the stress on the webs of beams 22, 24 when subject to loading on the stop assemblies 50. Additionally, this redistribution of forces provides a moment restraint (in addition to any moment restrain provided by the connection) for the connection formed by fasteners 60. As would be understood the two fasteners may provide a moment restraint for the stop assembly at the web unless using a standard AISC shear connection design—in which the moment restraint provided by the two fasteners is considered insignificant. It should be understood that the connection for the stop assembly to the web may be made by a single fastener, and therefore the redistribution of forces to the web will provide the primary, if not only, moment restraint for the stop assembly at its connection to the track. However, it should be understood that should sufficient torque be applied at the single fastener, such as a connection can provide a moment restraint for that connection, albeit again at the web of the track.

By reducing the stress on the webs of the beams 22, 24, the stop assemblies 50 may be located closer to the end of the beam without compromising the web of the beam, thus increasing the range of motion of track 10 along base while minimizing the footprint of the loading and unloading apparatus. For example, the edge distance for fasteners 60 with a diameter of about 3/16 inches, the edge distance (distance from the center of openings 62 to edge of webs 22*d,* 24*d*) may be reduced to ½ inches, optionally to about ⅓ inches, and optionally, about ¼ inches while still maintaining the integrity of the web (22*d,* 24*d*).

Although all four dead stop members 52 are described and shown as engaging the respective upper and lower flanges of each beam 22, 24, it should be understood that each stop assembly 50 may have a single projection 72 to engage a single flange of a beam. Alternately, each stop assembly 50 may have two projections 72 to engage two of the flanges (upper or lower or inner or outer) of a beam. Similarly, each stop assembly 50 may have three projections 72 to engage three flanges of the beam flanges. In addition, as noted above, the dead stop members 52 may be engaged with, and optionally coupled, to one or more rods 30. Thus, the dead stop members 52 may engage one or more flanges (and/or the webs) and/or one or more rods to redistribute the stresses in the web of the respective beam.

Figure 16:
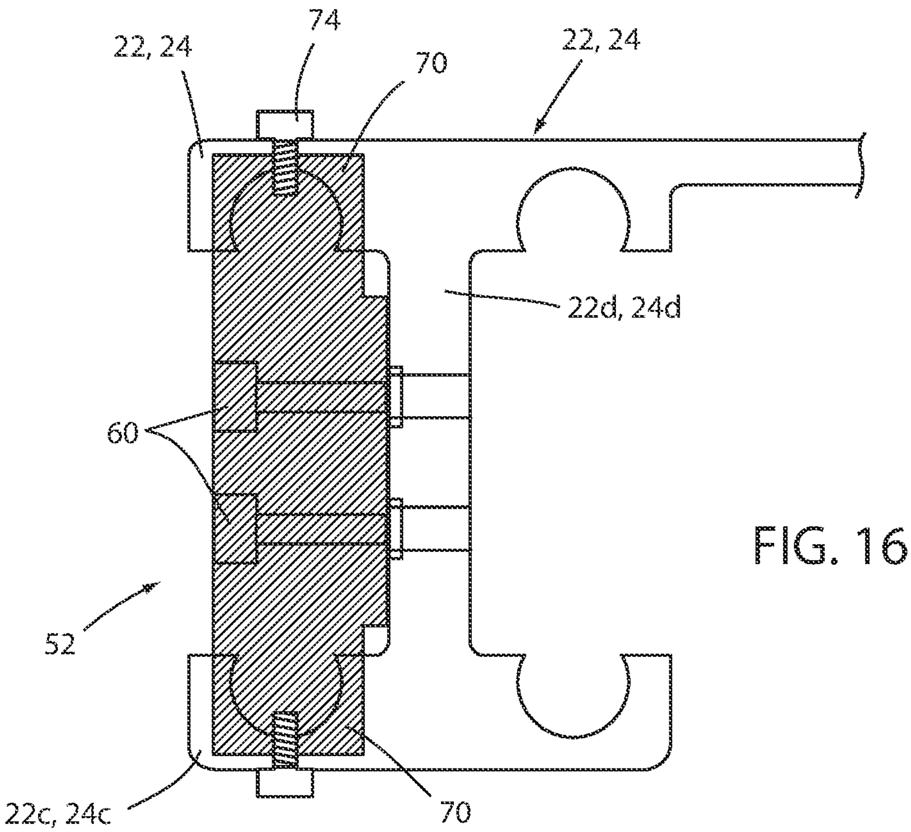
FIG. 16 is a cross-section view of the stop of the stop assembly illustrating an optional fastening arrangement.

Further, although illustrated as having the stop assemblies 50 mounted using fasteners 60 that extend through the collars 56*a* of one dead stop member 52, through the web (22*d* or 24*d*), and then through the respective collars 56*a* of the opposed dead stop member 52, additional fasteners 74 may be used to mount the respective stop assemblies to the beams. For example, referring to FIG. 16, one or more fasteners 74 may extend into the upper and lower ends of the respective bodies 70 of the dead stop members 52 to further increase the rigidity of the mounting arrangement of the stop assemblies 50.

Figure 9:
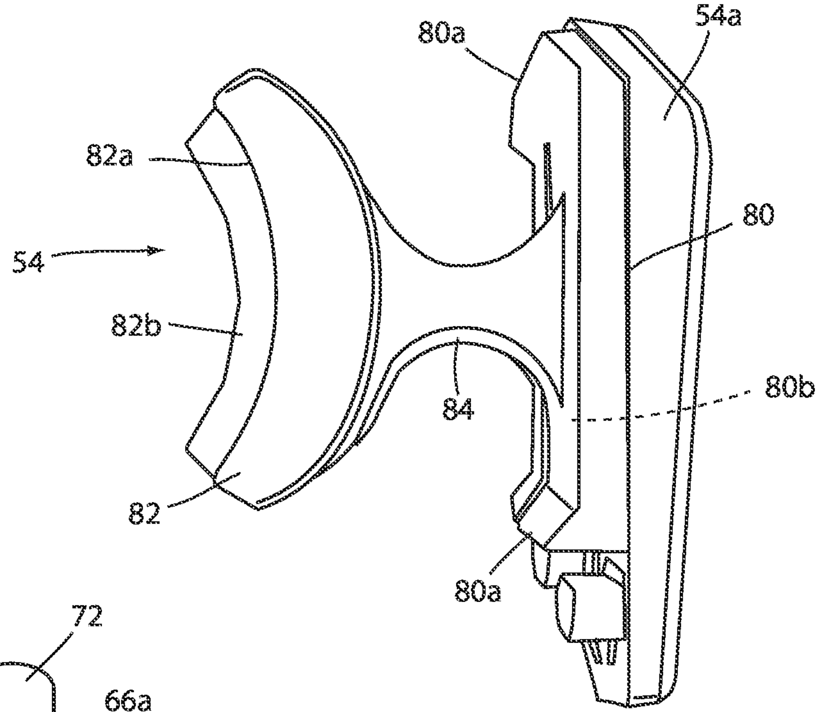
FIG. 9 is an enlarged side elevation view of the bumper of the stop assembly.

As noted, to reduce the noise upon impact with stop assemblies 50, stop assemblies 50 may include bumpers 54. Referring to FIG. 9, each bumper 54 may be formed as a unitary bumper with a base 80 and a pair spaced, generally C-shaped bearing members 82, which are formed or supported on arms 84 that project outwardly from base 80. In this manner, each bearing member 82 is cantilevered by arm 84 from base 80. Because each bearing member 82 is supported by a single arm 84, bumpers 54 can accommodate different fastener patterns than currently illustrated in FIGS. 5-8.

To provide some limited lateral restraint of the respective rollers (20 or 40) when engaged with stop assemblies 50, each bearing member 82 may have a profiled bumper contact bearing surface 82*a* that has a raised central ridge 82*b* facing the direction of the respective rollers 20, 40, which extends into the respective roller (which have annular recesses at their outer perimeter for engaging rods 30) and thereby can provide some lateral support to the rollers 20, 40 when the rollers 20, 40 engage the stop assemblies.

Arms 84, bearing members 82, and base 80 are shaped to receive in close registry (between base 80 and members 82) a pair of dead stop members 52. Further, each arm 84 and bearing member 82 is shaped so that the bearing blocks 56 of dead stop members 52 straddle the arms 84 and fill the space between members 82 and base 80. Additionally, base 80 is dimensioned so that it has the same footprint as the bearing blocks 56 and may also have upwardly projecting flanges 80*a* at its opposed sides that engage angled sides (FIG. 8) formed in bearing blocks 56 to thereby form a cradle for dead stop members 52.

Figure 9A:
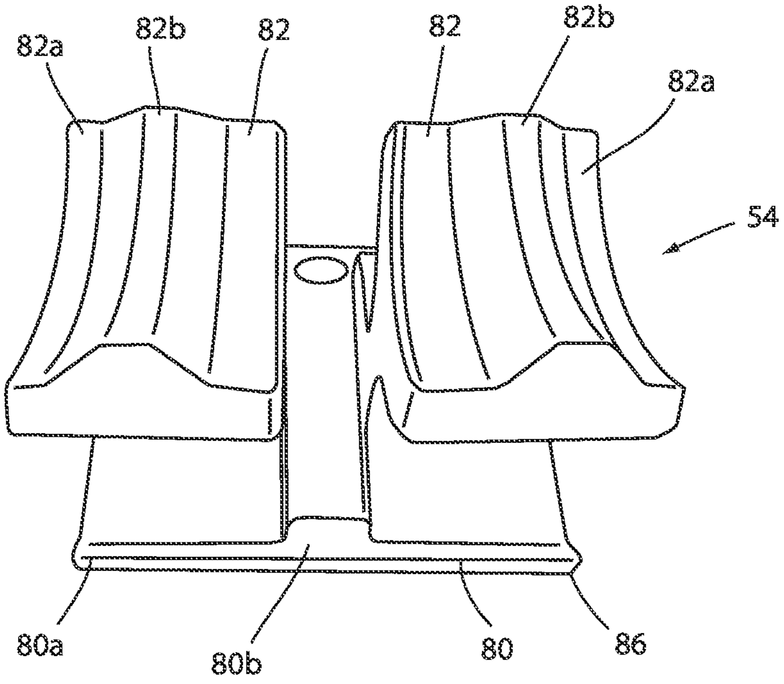
FIG. 9A is a perspective view of the bumper of the stop assembly.

In addition, as best seen in FIG. 9A, base 80 of bumper 54 includes an elongate slot or channel 80*b* formed therein between arms 84 for receiving a respective web 22*d,* 24*d* of the respective beam 22, 24 so that bumpers 54 may be slid onto the end of the beams 22, 24 via webs 22*d,* 24*d.* Bumpers 54 may be slid on onto the end of the beams 22, 24 via webs 22*d,* 24*d,* either with the dead stop members 52 at least partially mounted in the bumper 54 or without the dead stop members depending on the configuration of the track.

In the illustrated embodiment, the track 10 is modified so that the bumpers 54 may be mounted on the beams without the dead stop members 52, but thereafter have the dead stop members 52 mounted to the respective webs of the beams over bumpers 54. Thus, when bumpers 54 are mounted on the respective webs 22*d,* 24*d* of beams 22, 24 they form inner and outer dead stop mounting locations. To facilitate mounting the dead stop members 52 after bumpers 54 have been mounted, and as will be more fully described below, beams 22, 24 may have portions of their flanges notched to further facilitate installation of the dead stop members 52.

Figure 7:
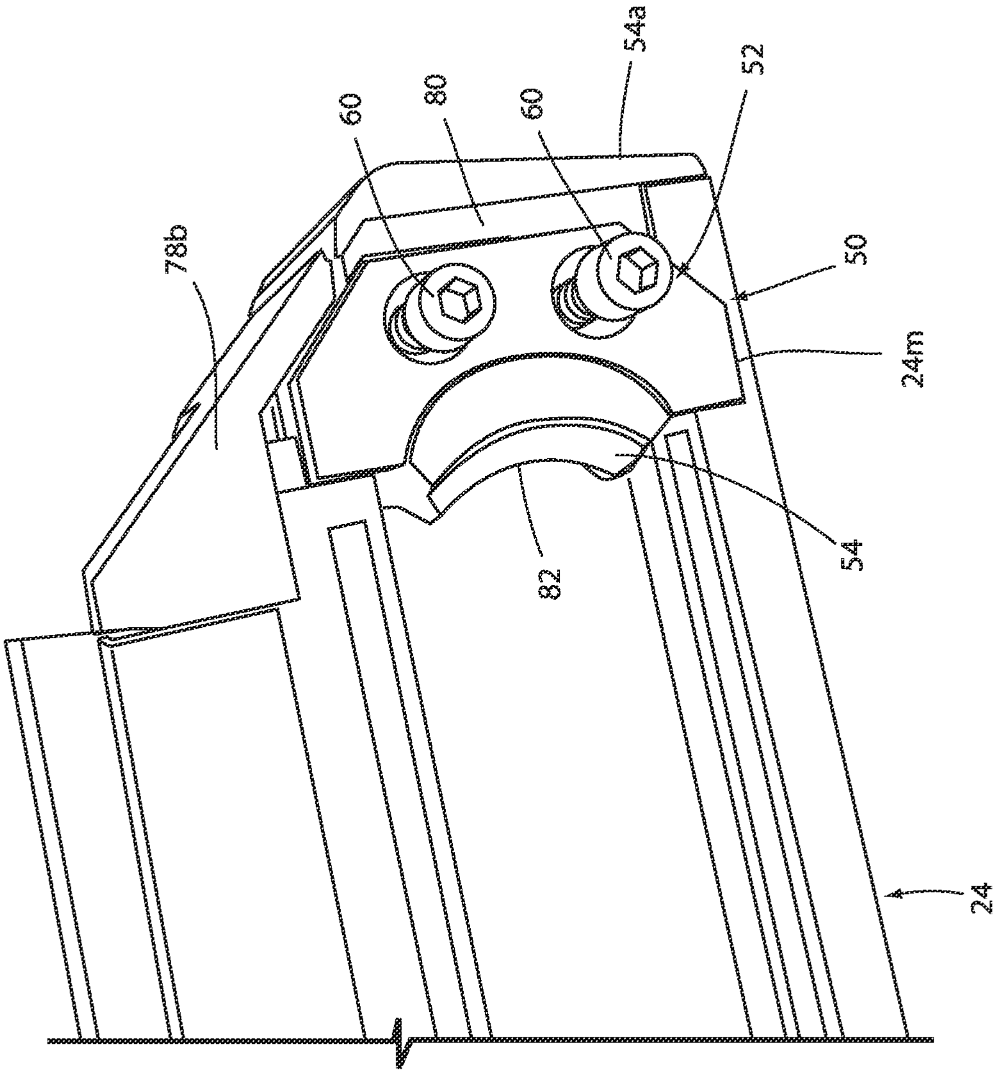
FIG. 7 is an enlarged perspective view of the head end of the transfer track.

As best seen in FIG. 7, each of the c-shaped bearing members 82 is sized and configured so that its side facing a respective dead stop member 52 (side opposed from its bearing surface 82*a*) follows the curved inner surface 66*b* of lobe 66 so that lobes 66 form a cradle for members 82. As noted above, bodies 70 of dead stop members 52 extend above and below (as view in FIG. 7) bearing blocks 56.

Bodies 70 also extend above and below the respective bumper 54 to mount the respective stop assembly 50 to the web 22*d*, 24*d* of the respective beam. In this manner, the height of the bumper 54 is smaller than the height of the dead stop members. Or stated another way, the height of the dead stop members 52 is taller than the height of the bumper 54. By making the bumpers 54 smaller than the prior art bumpers, there is more room to increase the size of the dead stop members and to leverage their increased size for increased engagement with the track 10, as described above.

Optionally, each bumper 54 includes a base plate 54*a*, for example, formed from a plastic material, which forms the outer surface of the stop assembly 50 when mounted to the respective beam.

Figure 7A:
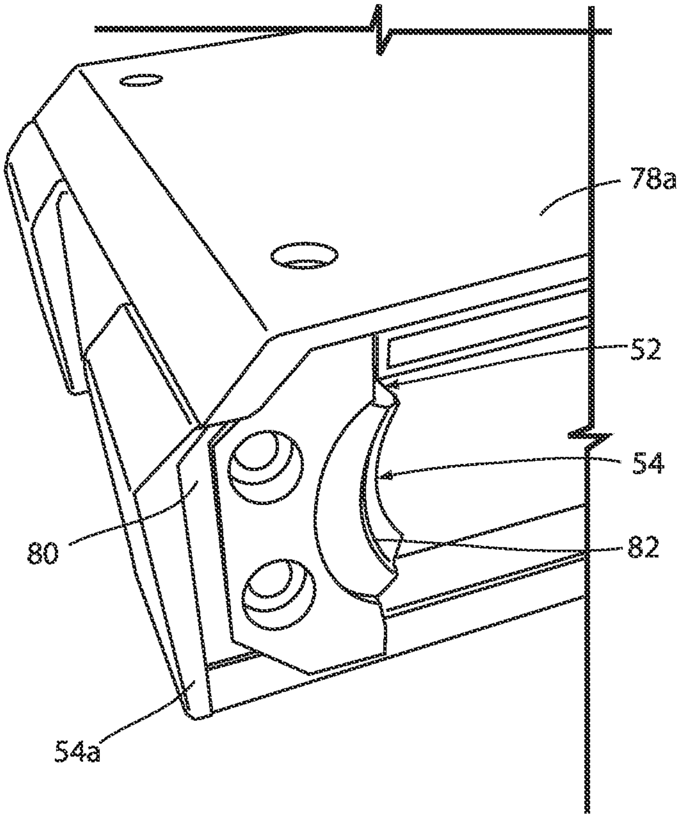
FIG. 7A is enlarged perspective view of the foot end of the transfer track.
Figure 7B:
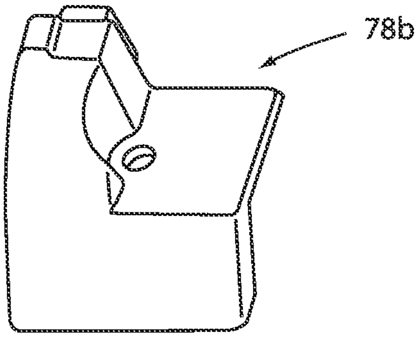
FIG. 7B is an enlarged perspective view of a cover for the head end of the track.
Figure 10:
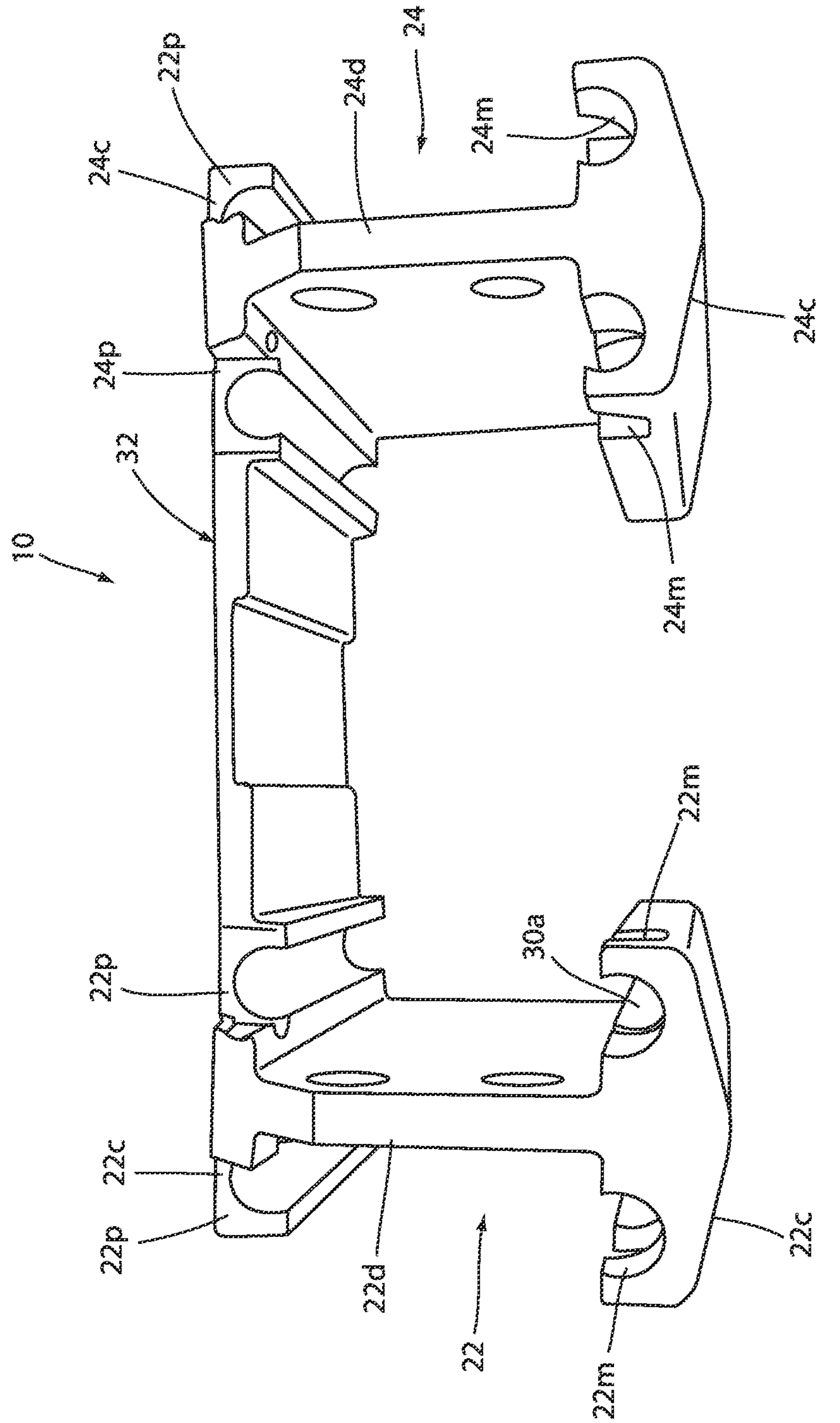
FIG. 10 is an enlarged in view of the foot end of the transfer track.
Figure 10A:
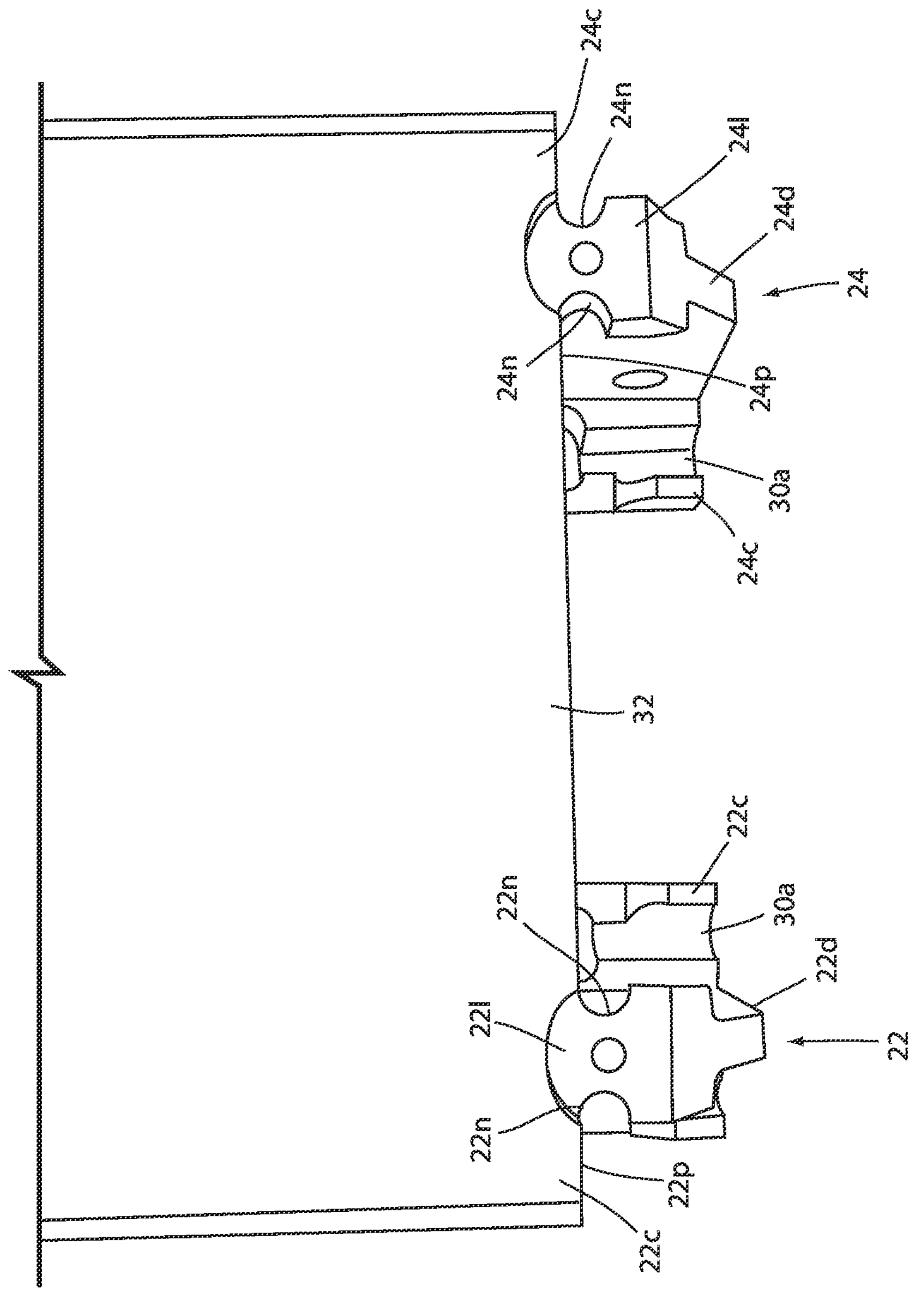
FIG. 10A is a plan view of the foot end of the transfer track.
Figure 11:
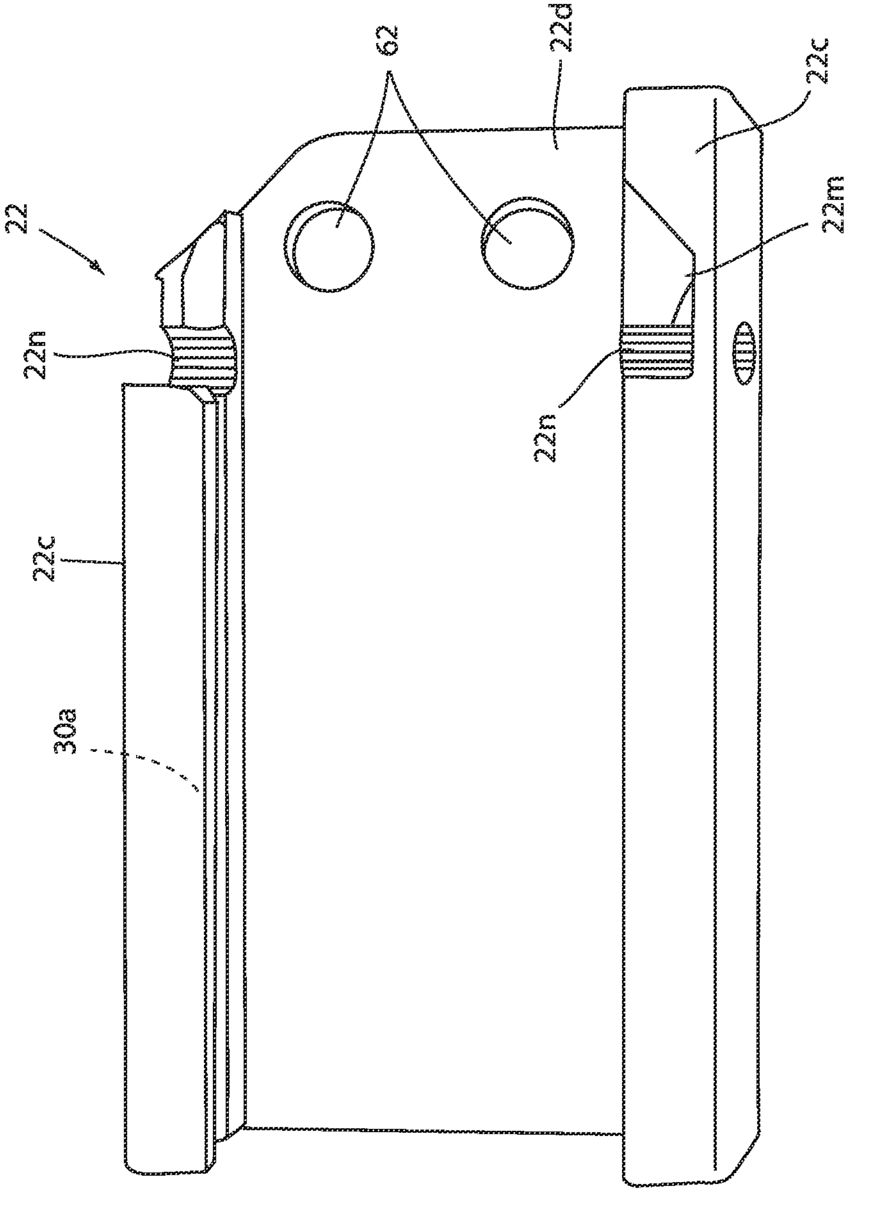
FIG. 11 is left side elevation view of the foot end of the transfer.
Figure 12:
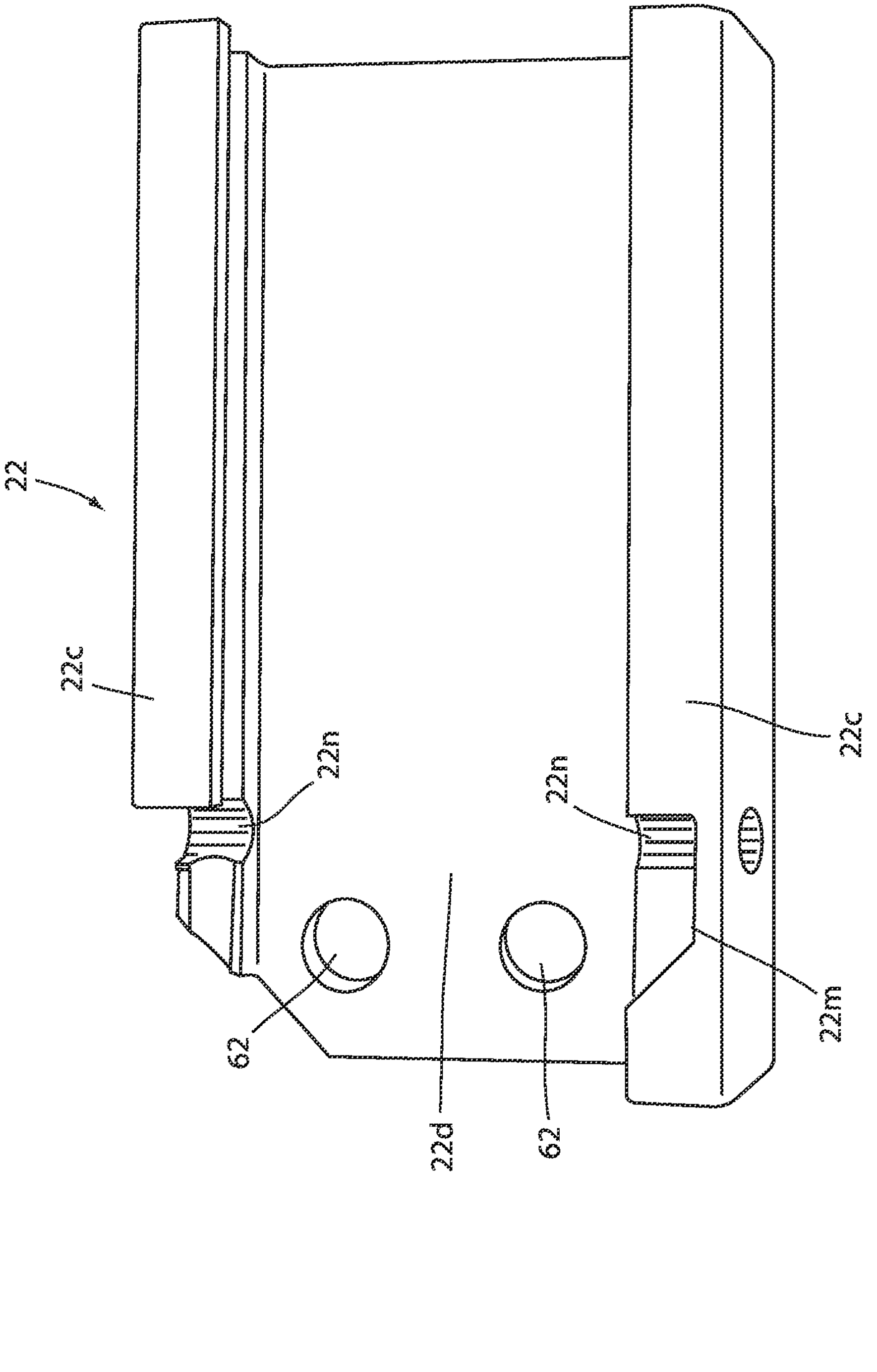
FIG. 12 is a right side elevation view of the foot end of the transfer track.
Figure 13:
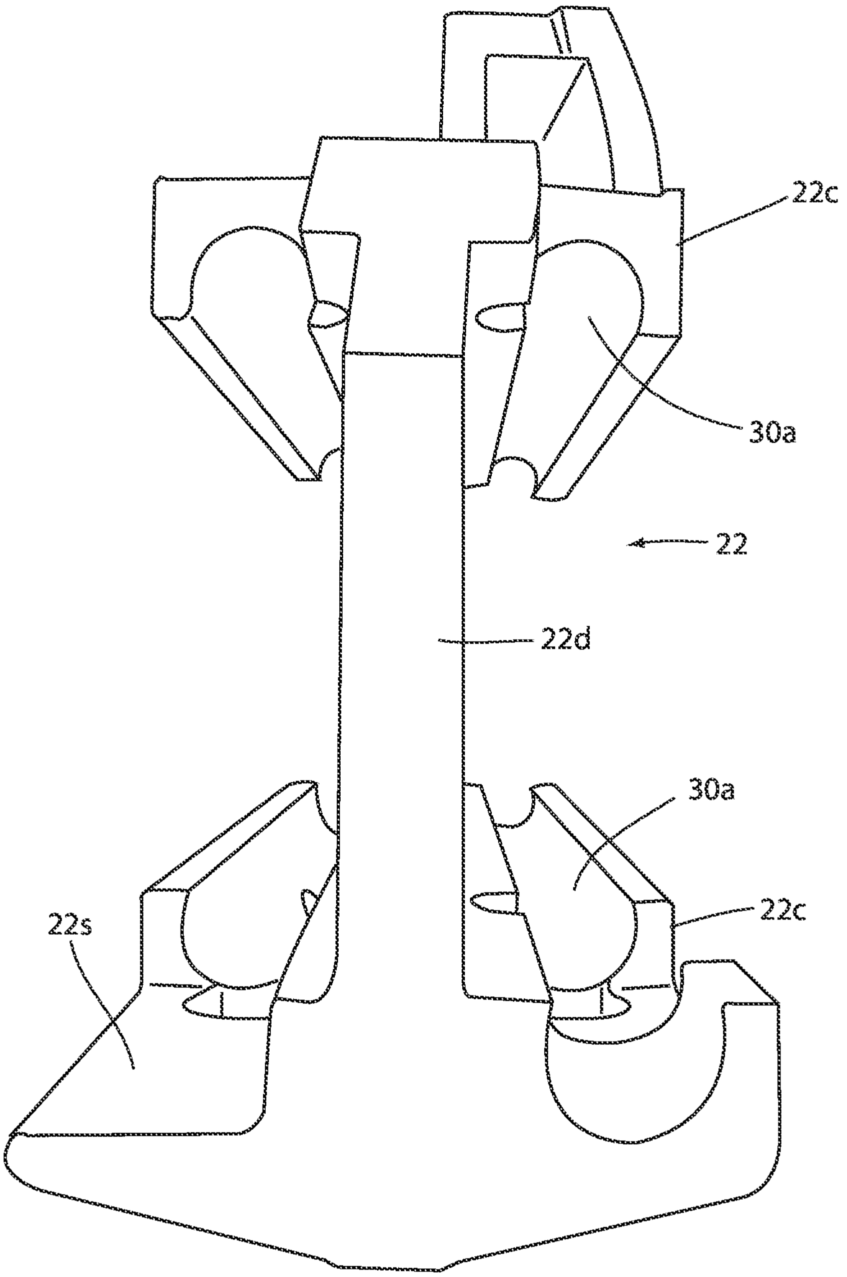
FIG. 13 is an end view of the right rail of the head end of the transfer track.
Figure 13A:
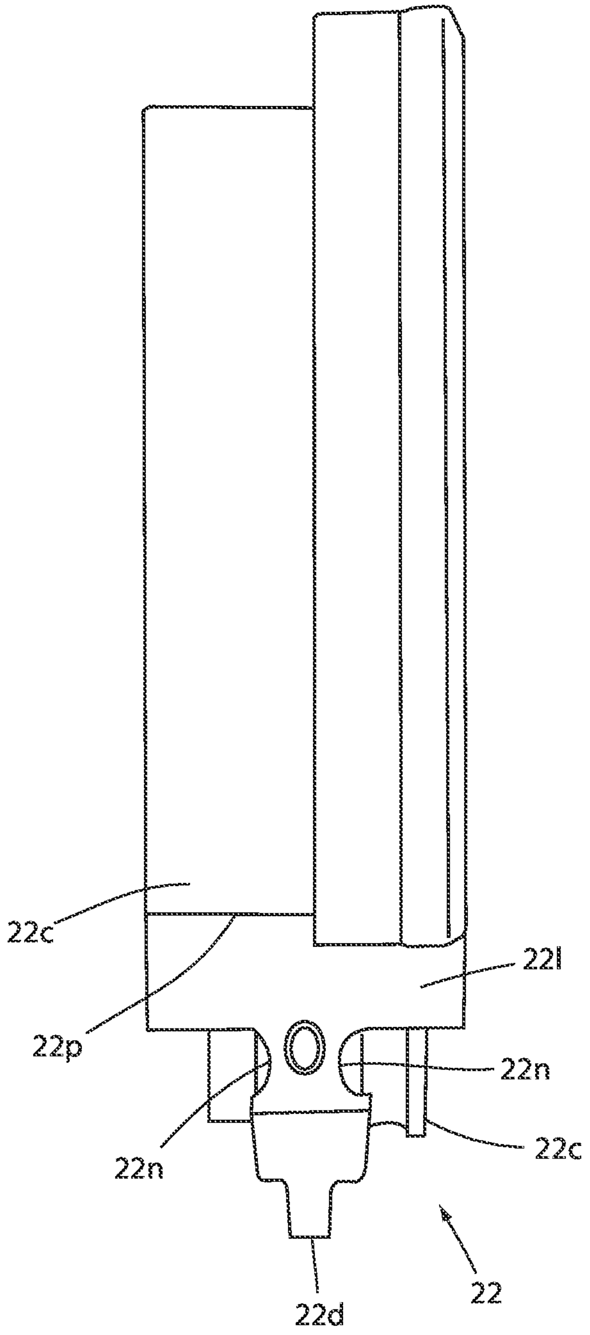
FIG. 13A is a plan view of the head end of the transfer track.
Figure 14:
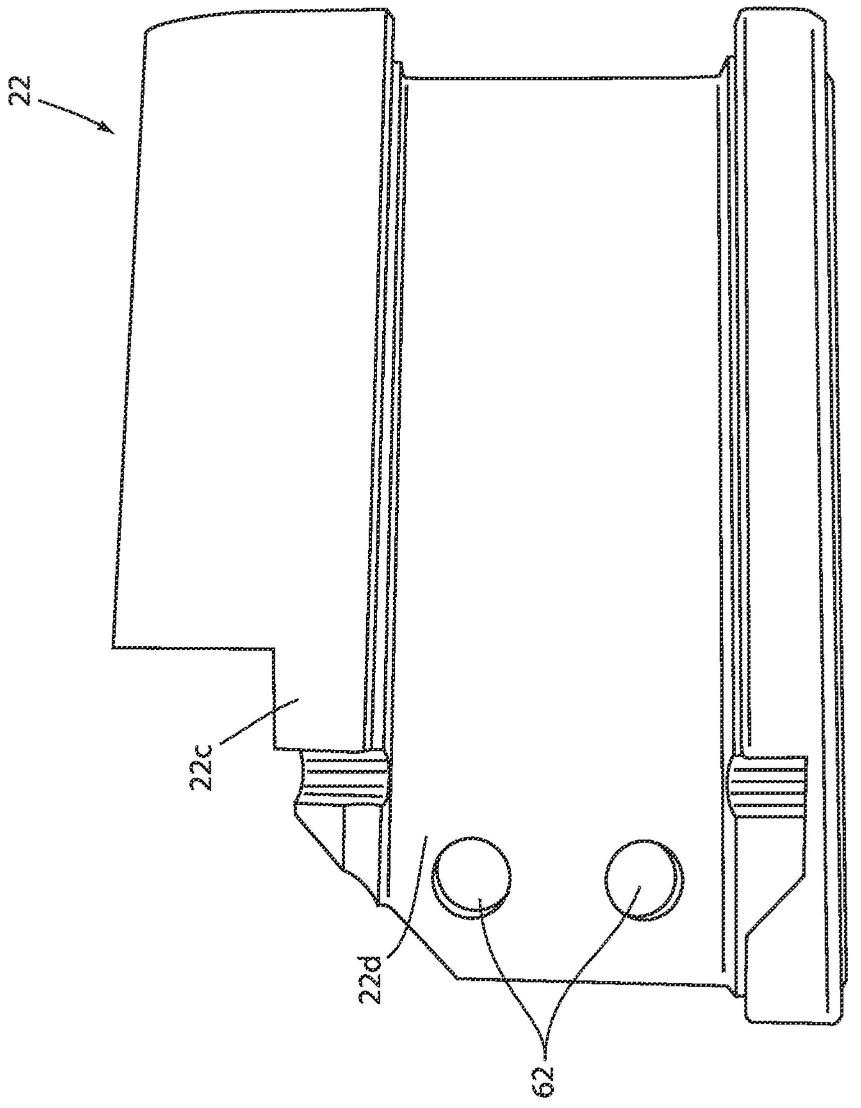
FIG. 14 is a right side elevation view of the right rail of the head end of the transfer track.
Figure 15:
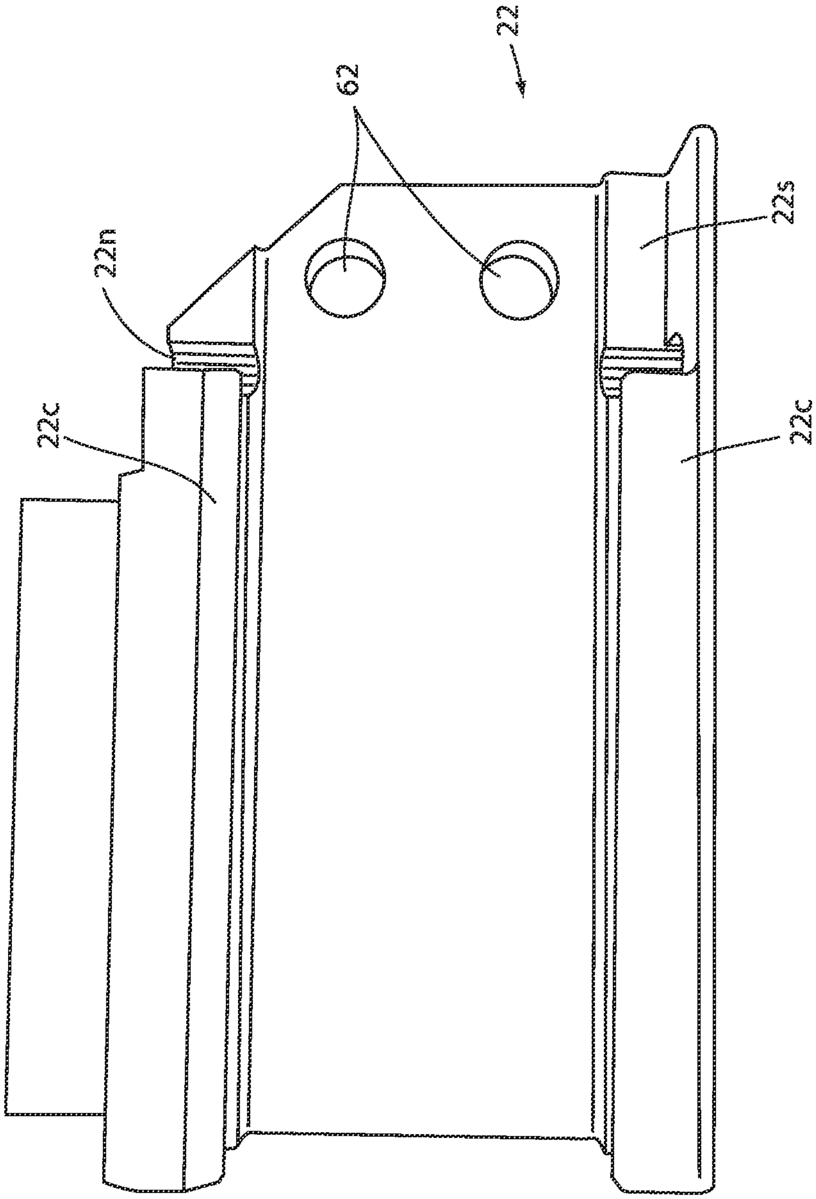
FIG. 15 is left side elevation view of the right rail of the head end of the transfer track.

As best seen in FIG. 5, each dead stop member 52 may have an overall height greater than the vertical spacing between the respective flanges 22*c*, 24*c* of the respective beams 22, 24. To facilitate installation of the dead stop members 52, and provide further engagement between the stop assemblies 50 and the respective beams 22, 24, at least the lower outer portions of flanges 22*c*, 24*c* and, optionally, the lower inner portions of flanges 22*c*, 24*c* of beams 22, 24 may include notches 22*m*, 24*m* (FIGS. 5-7). Notches 22*m*, 24*m* may be sized to receive the lower ends of bodies 70 (adjacent projections 72) to allow dead stop members 52 to be inserted from the side of track in position in bumpers 54. Notches 22*m*, 24*m* further mechanically couple the stop assemblies 50 to the respective beam, and namely to the flanges of the beams. Similarly, upper outer and inner outer portions of flanges 22*c*, 24*c* have terminal edges 22*p*, 24*p* inward of the terminal edges of webs 22*d*, which form additional bearing surfaces for bodies 70 of dead stop members 52 adjacent projections 72 and adjacent notches 22*n*. This also facilitates the mounting of dead stop members 52 of stop assemblies 50. Additionally, by terminating the upper flanges before the end of the webs, beams 22, 24 form landing or mounting surfaces 22L, 241L (FIGS. 5 and 10A) for covers 78*a*, 78*b* (FIG. 7A and 7B) that mount over the respective stop assemblies 50 and, optionally, in a manner so that the covers can be flush with at least the upper flanges 22*c*, 24*c* of beams 22, 24.

As noted above, in the illustrated embodiment, track 10 is slidably mounted on a base 16. Because the sliding arrangement, one end of the track 10 may have the stop assemblies mounted to one of its ends, while the other stop assemblies must be mounted after the track is already fed on the base 16. For example, the foot end of track 10 can be mounted to the base with the foot end of the track extended beyond the base, which can allow fairly easy access for mounting the stop assemblies 50 to the foot ends of beams 22, 24. However, when mounted to base 16, the head end of track 10 is always positioned adjacent base 16, regardless of the position of track 10 along base 16. To facilitate installation of stop assemblies 50 onto the head end of beams 22, 24, the inner lower portions of flanges 22*c*, 24*c* may have extended notches or slots 22*s*, 24*s* that extend from adjacent notches 22*n*, 24*n* to the end (e.g. terminal edges) of the respective beam 22, 24. In this manner, the dead stop members 52 can be mounted on the inside dead stop member position in bumper 54 before installation and then slid onto the respective web 22*d*, 24*d* from the terminal edge of the web. The remaining stop assemblies may be mounted by first sliding the bumpers 54 on to the webs 22*d*, 24*d* followed by the insertion of the dead stop members 52 into the spaces between members 82 and the base 80 of the respective bumper.

As would be understood, the integration of the stop assemblies into the beam and, further, with the flanges of the beams helps better redistribute the forces applied to dead stop members. It should be understood that the integration can be at any location along the beam and/or with the rods as noted, and further, as noted, may include a single point of integration (e.g., one lobe of the dead stop member or one rod) or more than one, and may be a combination of any of the load transferring mechanisms described above.

Although several forms of the invention have been disclosed for illustrative purposes, it will be recognized that variations or modifications of the disclosed apparatus, including the rearrangement of parts, lie within the scope of the present invention. Further, as noted, the track and stop assembly described herein may be used in a variety of different applications and may be used with stationary tracks or moving tracks, such as the nested arrangement described herein.

We claim:

1. A track assembly for mounting a movable object, the track assembly comprising:

a track, the track having a web and at least one flange joined with the web; and a stop assembly mounted to the track at the web by a connection, and the stop assembly configured to engage the flange to provide a moment restraint for the stop assembly via the flange of the track.

2. The track assembly according to claim 1, wherein the stop assembly is mechanically coupled to the flange.

3. The track assembly according to claim 2, wherein the flange comprises an upper flange, and the track having a lower flange joined with the web, wherein the stop assembly is engaged with the lower flange.

4. The track assembly according to claim 3, wherein the stop assembly is mechanically coupled to the lower flange.

5. The track assembly according to claim 1, wherein the stop assembly includes a bumper and a dead stop member, the dead stop member being mounted to the web through the bumper.

6. The track assembly according to claim 5, wherein the bumper includes a slot to receive the web, and the bumper straddling the web when the stop assembly is mounted to the web.

7. The track assembly according to claim 6, wherein the bumper includes a base and a bearing member cantilevered from the base.

8. The track assembly according to claim 7, wherein the bearing member is cantilevered from the base by a bumper arm, the dead stop member straddling the bumper arm when mounted to the track.

9. The track assembly according to claim 8, wherein the flange comprises an upper flange, and the track having a lower flange joined with the web, and the dead stop member engaging the upper and lower flanges.

10. The track assembly according to claim 9, wherein the upper and lower flanges have a fixed spacing, the dead stop member having a height greater than the fixed spacing, and the upper and lower flanges having notches to allow the dead stop member to be engaged with the upper and lower flanges through the notches.

11. The track assembly according to claim 1, wherein the web has a terminal edge, the connection being formed by a fastener, the fastener having a fastener spacing to the terminal edge of the web, and the stop assembly configured to transfer sufficient forces from the web to the flange wherein the fastener spacing is less than a minimum edge distance without compromising the web.

12. A track assembly comprising:

a track; and a stop assembly mounted to the track, the stop assembly having a bumper and a dead stop member, the bumper including a base and a bearing member cantilevered from the base by a bumper arm, and the dead stop member straddling the bumper arm when mounted to the track.

13. The track assembly according to claim 12, wherein the track includes a web and a flange extending from the web, and the stop assembly mounted to the web.

14. The track assembly according to claim 13, wherein the dead stop member is mounted to the web and engages the flange to transfer forces to the flange.

15. The track assembly according to claim 12, in combination with an ambulance cot loading and unloading apparatus, the ambulance cot loading and unloading apparatus including a base for mounting to an emergency vehicle deck, and the track being mounted to the base.

16. The track assembly according to claim 15, the ambulance cot loading and unloading apparatus further including a trolley configured to support an emergency cot, the trolley mounted for linear movement along the track from a retracted position to an extended position.

17. The track assembly according to claim 16, wherein the trolley includes at least one roller for engaging the track, and the track including a rod forming the bearing surface for the roller of the trolley, and the rod at least bearing on the stop assembly.

18. The track assembly according to claim 17, wherein the rod is coupled to the stop assembly.

19. A track assembly for mounting a movable object, the track assembly comprising:

a track, the track having a web and at least one flange joined with the web; and a stop assembly mounted to the track at the web by a fastener, the fastener having a property, the stop assembly having a bumper and a dead stop member, the dead stop member engaging the web through the bumper and having a bearing surface, the fastener extending through the dead stop member and through the bearing surface to engage the web, and the bearing surface having a ratio to the property in a range of 18 to 27, optionally 39 to 40, or optionally greater than 40.

20. The track assembly according to claim 19, wherein the property is a property selected from the group consisting of a diameter, a cross-sectional area, and a shear capacity.

* * * * *